United States Patent
Kobayashi et al.

(10) Patent No.: US 10,567,790 B2
(45) Date of Patent: Feb. 18, 2020

(54) NON-TRANSITORY COMPUTER-READABLE STORAGE MEDIUM FOR STORING IMAGE COMPRESSION PROGRAM, IMAGE COMPRESSION DEVICE, AND IMAGE COMPRESSION METHOD

(71) Applicant: FUJITSU LIMITED, Kawasaki-shi, Kanagawa (JP)

(72) Inventors: Shunsuke Kobayashi, Fukuoka (JP); Takato Ohashi, Fukuoka (JP); Yuji Nomura, Kurume (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 15/997,014

(22) Filed: Jun. 4, 2018

(65) Prior Publication Data
US 2018/0359482 A1 Dec. 13, 2018

(30) Foreign Application Priority Data
Jun. 7, 2017 (JP) .................................. 2017-112391

(51) Int. Cl.
*G06K 9/00* (2006.01)
*H04N 19/52* (2014.01)
(Continued)

(52) U.S. Cl.
CPC ........... *H04N 19/52* (2014.11); *G06T 3/4053* (2013.01); *G06T 7/11* (2017.01); *G06T 7/215* (2017.01); *H04N 19/172* (2014.11); *H04N 19/527* (2014.11); *G06T 2207/10016* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 7,538,795 B2 * | 5/2009 | Shibatani | ............... | H04N 5/232 348/208.14 |
| 10,358,090 B2 * | 7/2019 | Shiohara | .................. | H04N 7/18 |

FOREIGN PATENT DOCUMENTS

| | | |
|---|---|---|
| WO | 2008/123753 | 10/2008 |
| WO | 2015/098559 A1 | 7/2015 |

OTHER PUBLICATIONS

EESR, Extended European Search Report dated Nov. 6, 2018, from corresponding to European Patent Application No. 18176028.1.
(Continued)

*Primary Examiner* — Soo Jin Park
(74) *Attorney, Agent, or Firm* — Maschoff Brennan

(57) ABSTRACT

An image compression method, performed by a computer, includes: acquiring image data of an image captured by an imaging device mounted to a vehicle; setting a segmented region in a reference image corresponding to an image to be compressed and encoded; enlarging the reference image so that a magnification rate of a region including the periphery of the reference image is greater than a magnification rate of a region including a center point of the reference image in the segmented region, the center point being a contact point of an optical axis of the image incident to the imaging device and an imaging element in the imaging device; generating a predictive image in accordance with the enlarged reference image; and compressing and encoding image data of the image to be encoded in accordance with the generated predictive image.

12 Claims, 22 Drawing Sheets

(51) Int. Cl.
　　　*G06T 7/11*　　　(2017.01)
　　　*G06T 3/40*　　　(2006.01)
　　　*G06T 7/215*　　　(2017.01)
　　　*H04N 19/527*　　(2014.01)
　　　*H04N 19/172*　　(2014.01)

(56) References Cited

OTHER PUBLICATIONS

Park S et al., "TE3: Motion compensation with adaptive warped reference", 94 MPEG Meeting; Oct. 11, 2010-Oct. 15, 2010; Guangzhou; (Motion Picture Expert Group or ISO/IEC JTC1/SC29/WG11), No. M18054, Oct. 11, 2010 (Oct. 11, 2018), XP838046644. Marc Bosch et al., "Segmentation-Based Video Compression Using Texture and Motion Models", IEEE Journal of Selected Topics in Signal Processing, IEEE, US, vol. 5, No. 7, Nov. 1, 2011(Nov. 1, 2011), pp. 1366-1377, XP011363093.

\* cited by examiner

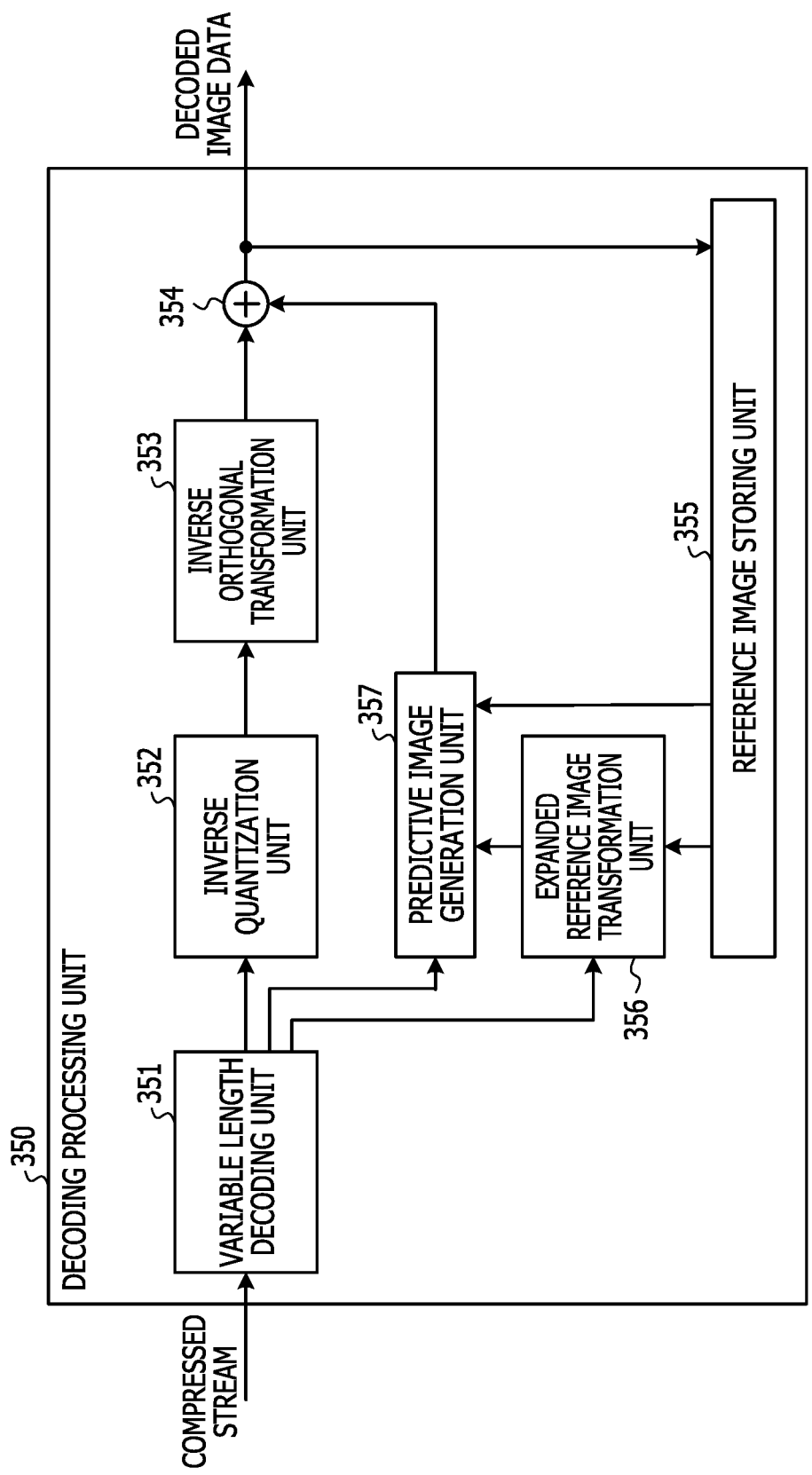

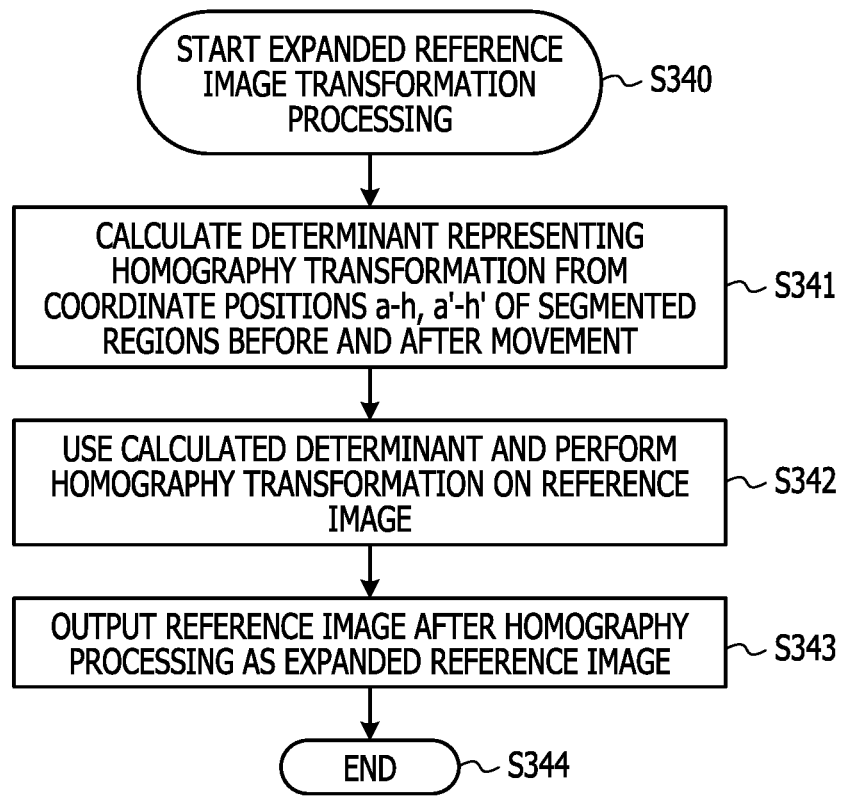

NON-TRANSITORY COMPUTER-READABLE STORAGE MEDIUM FOR STORING IMAGE COMPRESSION PROGRAM, IMAGE COMPRESSION DEVICE, AND IMAGE COMPRESSION METHOD

CROSS-REFERENCE TO RELATED APPLICATION

This application is based upon and claims the benefit of priority of the prior Japanese Patent Application No. 2017-112391, filed on Jun. 7, 2017, the entire contents of which are incorporated herein by reference.

FIELD

The embodiments discussed herein are related to a non-transitory computer-readable storage medium for storing an image compression program, an image compression device, and an image compression method.

BACKGROUND

Presently, there is a wide distribution of products that use image compression encoding technology such as video cameras and digital versatile disks (DVDs). Moreover, there are active discussions in the field of image compression encoding to further improve the efficiency and quality of compression encoding with regard to the next generation of compression encoding technology.

For example, Moving Picture Experts Group-2 (MPEG-2) and H.264 MPEG-4 advanced video coding (AVC) (hereinafter may be referred to simply as "H.264") are known as standards established by the International Organization for Standardization/International Electrotechnical Commission (ISO/IEC) with regard to compression encoding technology.

Motion compensation is performed when encoding between frames in compression encoding such as H.264. Motion compensation is a method for detecting, for example, how a subject or the like moves before and after successive images (or image frames, herein after may be referred to simply as "frames"). Specifically, motion compensation is a technique, for example, that involves an image compression device searching for motion vectors based on a decoded image (or a reference image) and an image to be encoded, generating a predictive image in which the reference image is shifted by the motion vector, and performing compression encoding on the differential between the generated predictive image and the image to be encoded. It is possible to perform compression encoding that uses the correlations between frames to greatly compress the information amount of image data by using predictive encoding based on motion compensation.

However, with images taken using operations such as zooming and the like in cameras, a differential value that is too large to be taken as a differential may be generated in each pixel before and after the frame even though the fact that the size of a certain subject is made larger and smaller can be recognized by human eyes before and after a frame. In this case, even if motion vector searching is performed by using motion compensation, the motion vector is difficult to be calculated accurately. Further, even if a predictive image is generated, the predictive image and the image to be encoded differ greatly and consequently the compression rate is reduced.

Accordingly, there is a technique called global motion compensation. Global motion compensation is a technique for generating a reference image for handling, for example, zooming, panning, or tilting or the like of a camera. It is possible to process a reference image by using the global motion compensation and improve accuracy and avoid a reduction in the compression rate in comparison to the abovementioned motion vector. However, although global motion compensation has been applied to MPEG-4 version 2 (V2), the use of global motion compensation in H.264 has been ignored.

For example, a known technique that is related to compression encoding may be provided as an encoding device that increases or reduces the size of a reference image pertaining to an inter-encoding image, uses a reference image the size of which has been increased or reduced to generate a predictive image, and uses the generated predictive image to encode an image to be encoded.

According to this technique, the encoding efficiency may be improved up to a certain extent when increasing or reducing the size of the image to be encoded.

Examples of the related art include International Publication Pamphlet No. WO 2015/098559.

SUMMARY

According to an aspect of the invention, an image compression method, performed by a computer, includes: executing first processing that includes acquiring image data of an image captured by an imaging device mounted to a vehicle; executing second processing that includes setting a segmented region in a reference image corresponding to an image to be compressed and encoded; executing third processing that includes enlarging the reference image so that a magnification rate of a region including the periphery of the reference image is greater than a magnification rate of a region including a center point of the reference image in the segmented region, the center point being a contact point of an optical axis of the image incident to the imaging device and an imaging element in the imaging device; executing fourth processing that includes generating a predictive image in accordance with the enlarged reference image; and executing fifth processing that includes compressing and encoding image data of the image to be encoded in accordance with the generated predictive image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates a configuration example of a decoding processing unit;

FIG. 16 is a flow chart of an example of expanded reference image transformation processing;

DESCRIPTION OF EMBODIMENTS

Figure 1:
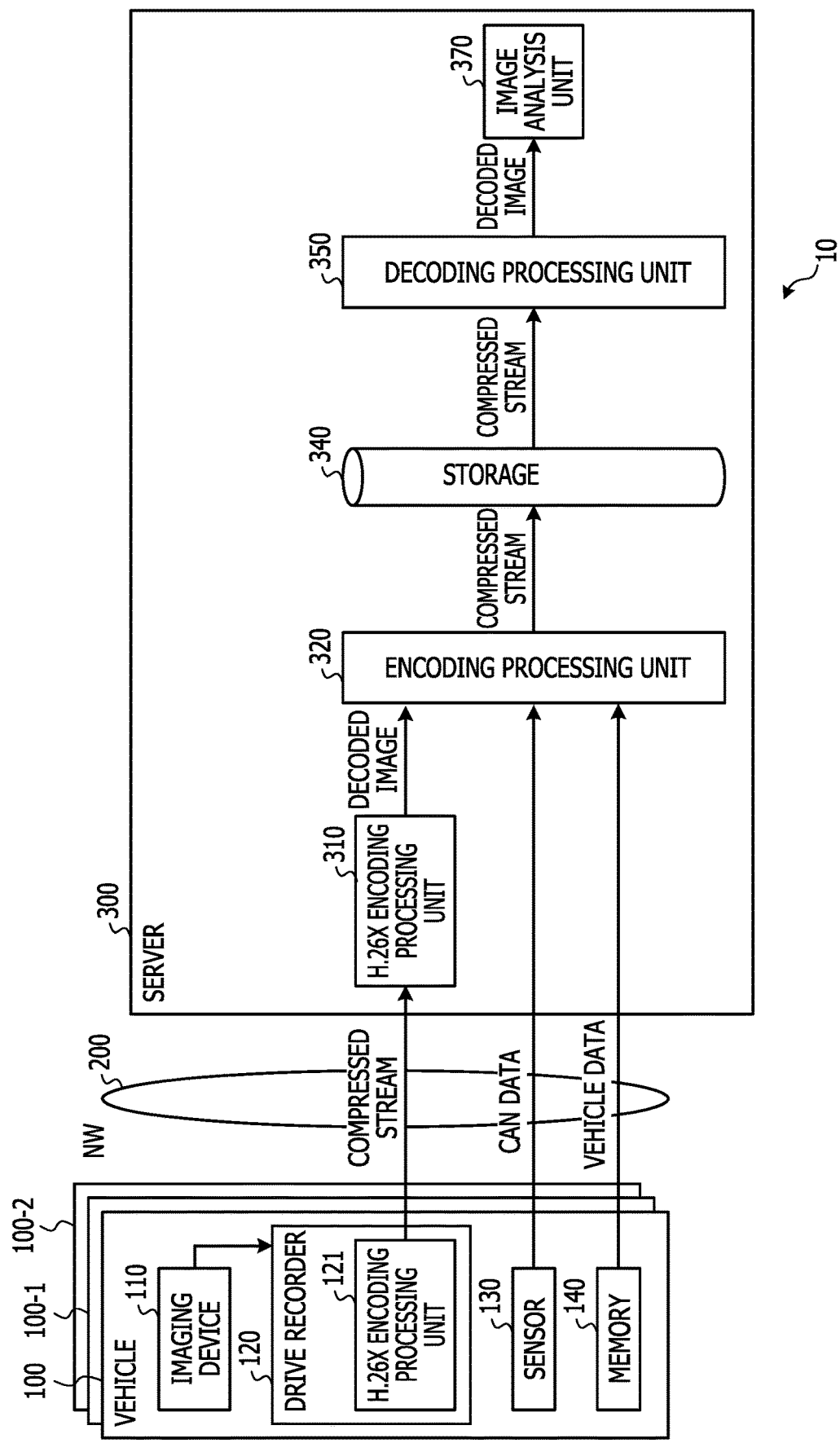
FIG. 1 illustrates a configuration example of a video image transfer system.

Compression encoding may be carried out when storing images captured by a vehicle-mounted camera in a drive recorder. The images captured by the vehicle-mounted camera are images taken by a camera configured to be mounted to a vehicle, and the motions before and after each frame of the images differ from those of a camera zoom. For example, consider images captured by a vehicle-mounted camera while the vehicle is moving forward. In this case, when the taken images include an object spaced far away from the vehicle and an object near the vehicle, the former object may not vary as much as time passes, but the latter object may vary greatly when the same amount of time passes. In this way, when a plurality of objects are included in images captured by a vehicle-mounted camera, the enlargement ratio and the reduction ratio of each object do not change uniformly before and after a frame but instead change in response to the distance from the vehicle to the object.

The technique for increasing and reducing the size of a reference image corresponding to the abovementioned inter-encoding images is, for example, a technique that uniformly increases and reduces the size of a reference image. As a result, even if the sizes of the images captured by the vehicle-mounted camera are increased and reduced uniformly, the technique does not address variations of the object corresponding to the distance from the vehicle and does not address variations in the images captured by a vehicle-mounted camera mounted to a vehicle. Therefore, even if a predictive image is generated based on a reference image the size of which has been uniformly increased or reduced, the difference between the reference image and the image to be encoded is large and the concordance rate between the reference image and the image to be encoded is low. In this case, even if the predictive image is generated based on the reference image, the differential value between the predictive image and the image to be encoded will also be large and the compression rate may be reduced.

According to an aspect, there is provided an image compression program, an image compression device, and an image compression method in which the concordance rate between a reference image and an image to be encoded is improved.

Further, according to an aspect, there is provided an image compression program, an image compression device, and an image compression method in which a reduction in the compression rate is avoided.

The following is a detailed explanation of the embodiments discussed herein with reference to the accompanying drawings. The problem and examples in the present description are merely for example and do not limit the scope of rights of the present application. The embodiments may be combined as appropriate within the limitations of consistency of the contents of the processing. Moreover, the words used in the present description and the technical contents described herein may be words and technical contents described in written standards which are standards pertaining to image compression encoding such as ISO/IEC and the like.

First Embodiment

<Video Image Transfer System>

FIG. 1 illustrates an example of a configuration of a video image transfer system 10 according to the first embodiment. The video image transfer system 10 includes a plurality of vehicles 100, 100-1, 100-2, and a server device (or a server, and may be referred to below as "server") 300. The vehicles 100, 100-1 and 100-2 all have the same configuration and the explanation will use the vehicle 100 as a representative. The vehicle 100 and the server 300 are connected over a network 200.

The vehicle 100 is provided with an imaging device 110, a drive recorder 120, a sensor 130, and a memory 140.

The imaging device 110 is a camera, for example, and is mounted to the vehicle 100 and captures images of the surroundings of the vehicle 100. The imaging device 110 outputs image data of the captured images to the drive recorder 120.

The drive recorder 120 includes a H.26x encoding processing unit 121. The H.26x encoding processing unit 121 performs compression encoding processing that conforms to H.263 or H.264 standards on image data acquired from the imaging device 110. The drive recorder 120 is provided with an internal memory, for example, and the compressed and encoded image data (which may be referred to below as "compressed data") is stored in the internal memory and output to a wireless communication device mounted to the vehicle 100. The compressed data is transmitted via the wireless communication device to the network 200 as a compression stream.

The sensor 130 measures, for example, the speed v of the vehicle 100, a steering angle θ of the steering wheel, and an observation interval time t and the like. The sensor 130 transmits the measured data as controller area network (CAN) data via the wireless communication device to the network 200.

The memory 140 stores vehicle data pertaining to the vehicle 100 and transmits the vehicle data via the wireless communication device to the network 200. The vehicle data includes information such as the height of the installation position of the imaging device 110 in the vehicle 100, and the length and width of the vehicle 100.

The server 300 receives the compression stream the CAN data (or sensor data), and the vehicle data transmitted from the vehicle 100 via the network 200. The server 300 is provided with a H.26x decoding processing unit 310, an encoding processing unit 320, a storage 340, a decoding processing unit 350, and an image analysis unit 370.

The H.26x decoding processing unit 310 carries out decoding processing on the compressed data included in the compression stream and decodes the decoded image data. The decoding processing performed by the H.26x decoding processing unit 310 corresponds to the encoding processing performed by the H.26x encoding processing unit 121. The H.26x decoding processing unit 310 outputs the decoded decoding image data as original image data to the encoding processing unit 320.

The encoding processing unit 320 acquires the original image data from the H.26x decoding processing unit 310, receives the CAN data and the vehicle data transmitted from the vehicle 100, and performs compression encoding processing on the original image data. At this time, the encoding processing unit 320, for example, sets segmented regions in the reference image with respect to the image to be encoded, and enlarges the reference image so as to increase the magnification rate of regions on the periphery of the reference image in comparison to the magnification rate of a region that includes the center point of the reference image in the segmented regions. The encoding processing unit 320 then uses the enlarged reference image to generate a predictive image, and uses the generated predictive image to compress and encode the original image data which is the image to be encoded. An operation example of a configuration example of the encoding processing unit 320 is discussed below. The encoding processing unit 320 outputs the compressed data which is the original image data that has been compressed and encoded, to the storage 340 as a compression stream.

The storage 340 is, for example, a large capacity memory and stores the compression stream output from the encoding processing unit 320. The compression stream can be read by the decoding processing unit 350.

The decoding processing unit 350 performs decoding processing on the compression stream read from the storage 340 and decodes the decoding image data. The decoding processing performed by the decoding processing unit 350 corresponds to the encoding processing performed by the encoding processing unit 320. The decoding processing unit 350 outputs the decoded decoding image data to the image analysis unit 370.

The image analysis unit 370 displays decoded images on a monitor screen based on the decoding image data, and uses the displayed decoded images when performing image analysis. The image analysis may include, for example, analyzing conditions immediately before a traffic accident occurs (which may be referred to below as "close calls") in images acquired at the same location.

For example, the server 300 includes the encoding processing unit 320 and therefore the server 300 may also be an image compression device.

In the video image transfer system 10 illustrated in FIG. 1, the encoding processing unit 320 is present in the server 300, but may also be provided inside the vehicle 100. In this case, the vehicle 100, for example, may also be an image compression device. In this case, the H.26x encoding processing unit 121 may be replaced by the encoding processing unit 320. The H.26x decoding processing unit 310 and the encoding processing unit 320 may be omitted from the server 300, and the compression stream output from the encoding processing unit 320 may be stored directly in the storage 340.

<Configuration Example of Encoding Processing Unit>

Figure 2:
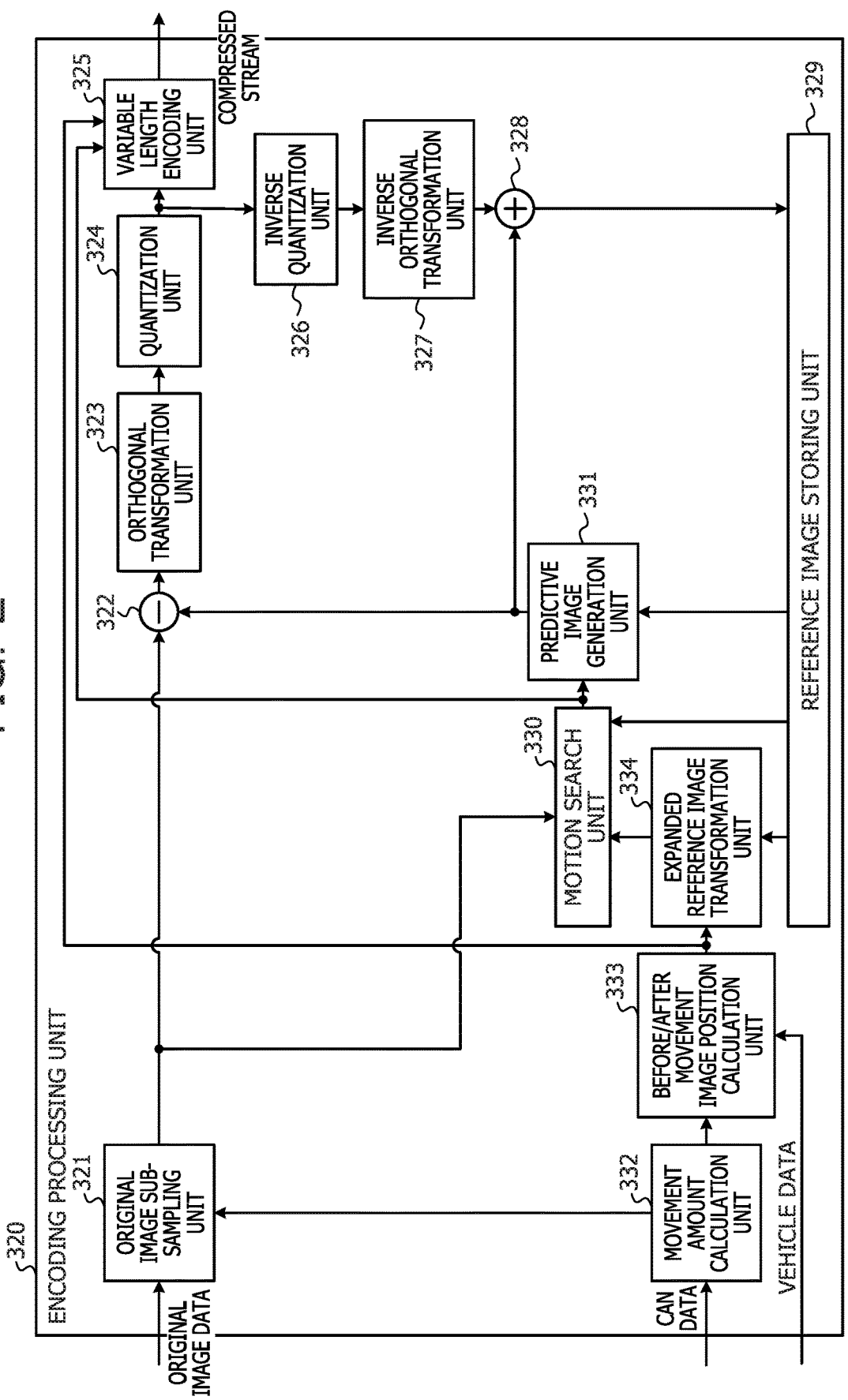
FIG. 2 illustrates a configuration example of an encoding processing unit.

FIG. 2 illustrates a configuration example of the encoding processing unit 320. The encoding processing unit 320 is provided with an original image sub-sampling unit 321, a subtraction unit 322, an orthogonal transformation unit 323, a quantization unit 324, a variable length encoding unit 325, an inverse quantization unit 326, an inverse orthogonal transformation unit 327, an addition unit 328, a reference image storing unit 329, a motion search unit 330, and a predictive image generation unit 331. The encoding processing unit 320 is further provided with a movement amount calculation unit 332, a before/after movement image position calculation unit (which may be referred to below as "image position calculation unit") 333, and an expanded reference image transformation unit (which may be referred to below as "reference image transformation unit") 334.

The original image sub-sampling unit 321 outputs the received original image data at a predetermined timing based on the movement amount and the CAN data output from the movement amount calculation unit 332. For example, the original image sub-sampling unit 321 performs the following processing. Specifically, the original image sub-sampling unit 321 outputs the original image data at a timing at which the time information included in the original image data and the time information included in the CAN data match each other. In addition, the original image sub-sampling unit 321 calculates, for example, the movement distance $l = vt \cdot \sin \theta$ of the vehicle 100 based on the observation interval time t and the velocity v of the vehicle 100 included in the CAN data, and the steering angle $\theta$ of the steering wheel. The original image sub-sampling unit 321 then discards the input original image data until the calculated movement distance l matches a designated distance. When a match occurs, the original image sub-sampling unit 321 outputs the received original image data. The original image sub-sampling unit 321 outputs the sampled original image data to the subtraction unit 322 and the motion search unit 330.

The subtraction unit 322, for example, outputs the original image data acquired from the original image sub-sampling unit 321 to the orthogonal transformation unit 323 without performing subtraction during an intra-frame predictive encoding mode (or an intra-mode). In addition, the subtraction unit 322, for example, subtracts the image data of the predictive image output from the predictive image generation unit 331, from the original image data output from the original image sub-sampling unit 321 during an inter-frame predictive encoding mode (or inter-mode), calculates the image data of a difference image (which may be referred to below as "difference image data"), and outputs the calculated difference image data to the orthogonal transformation unit 323.

The orthogonal transformation unit 323 performs orthogonal transformation on the original image data or the difference image data. For example, the orthogonal transformation unit 323 applies discrete cosine transformation (DCT) to the original image data or the difference image data in units of macroblocks (e.g., 16×16 pixel units), thereby calculating a component after the orthogonal transformation (or a DCT coefficient). The orthogonal transformation unit 323 outputs the component after orthogonal transformation of the original image data or the difference image data to the quantization unit 324.

The quantization unit 324 quantizes the component after orthogonal transformation with a quantization value. For example, the quantization unit 324 calculates the quantization value by rounding off the result of dividing the component after orthogonal transformation of the original image data or the difference image data by a quantization step (e.g., "16"), to an integer. The quantization unit 324 outputs the calculated quantization value to the variable length encoding unit 325 and the inverse quantization unit 326 as a transformation coefficient.

The variable length encoding unit 325 performs variable length encoding processing on the transformation coefficient output from the quantization unit 324, on motion vector information calculated by the motion search unit 330, and on expanded reference image transformation parameters calculated by the image position calculation unit 333. For example, the variable length encoding unit 325 uses an encoding algorithm such as context-based adaptive binary arithmetic coding (CABAC) to perform the variable length encoding. The variable length encoding unit 325 outputs the variable length encoded transformation coefficient corresponding to the original image data as, for example, a compression stream of intra-pictures (I-pictures). In addition, the variable length encoding unit 325 outputs the variable length encoded transformation coefficient corresponding to the difference image data as, for example, a compression stream of predictive pictures (P-pictures) or bi-directionally predictive pictures (B-pictures). Furthermore, the variable length encoding unit 325 multiplexes the variable length encoded motion vectors and expanded reference image transformation parameters into a compression stream of each picture and outputs the compression stream. The variable length encoding unit 325 stores the compression stream in the storage 340. The expanded reference image transformation parameters are discussed in detail below.

The inverse quantization unit 326 multiplies the transformation coefficient output from the quantization unit 324 by the quantization step used by the quantization unit 324, thereby calculating an orthogonal component of the difference image data or of the original image data before the data becomes a quantization value. The inverse quantization unit 326 outputs the calculated orthogonal component to the inverse orthogonal transformation unit 327.

The inverse orthogonal transformation unit 327 uses, for example, a predetermined arithmetic equation on the orthogonal component of the original image data or the difference image data, performs inverse orthogonal transformation (e.g., inverse DCT transformation), and calculates the original image data or the difference image data before the orthogonal transformation. The inverse orthogonal transformation unit 327 outputs the calculated original image data or difference image data to the addition unit 328.

The addition unit 328 stores the image data output from the inverse orthogonal transformation unit 327 in the reference image storing unit 329 as-is without performing multiplication when the image data output from the inverse orthogonal transformation unit 327 corresponds to the original image data. In addition, the addition unit 328 adds together the difference image data output from the inverse orthogonal transformation unit 327 and the image data of the predictive image output from the predictive image generation unit 331 when the image data output from the inverse orthogonal transformation unit 327 corresponds to the difference image data, and stores the added image data in the reference image storing unit 329. The addition unit 328 stores the original image data and the added image data in the reference image storing unit 329 as the image data of the reference image.

The reference image storing unit 329 stores the image data of the reference image. The reference image storing unit 329 is able to appropriately store the image data of the reference image from the addition unit 328, and the stored image data of the reference image can be appropriately read by the motion search unit 330, the predictive image generation unit 331, and the reference image transformation unit 334.

The motion search unit 330 searches for motion vectors based on the original image data output from the original image sub-sampling unit 321 and the image data of the reference image read from the reference image storing unit 329. Specifically, the motion search unit 330 searches for motion vectors based on the image data to be encoded output from the original image sub-sampling unit 321, and on image data of the decoded image of one frame before the image to be encoded, the image data being read from the reference image storing unit 329.

In addition, the motion search unit 330 searches for motion vectors based on the original image data output from the original image sub-sampling unit 321 and on image data of the reference image that has been expanded and transformed (which may be referred to below as "expanded reference image") output from the reference image transformation unit 334. Specifically, the motion search unit 330 searches for motion vectors based on the image data to be encoded output from the original image sub-sampling unit 321, and on image data of the decoded image, that has been modified, of one frame before the image to be encoded, the image data being read from the reference image transformation unit 334.

While two motion vectors are calculated by the motion search unit 330, the motion vector having the best search result is output to the predictive image generation unit 331 and the variable length encoding unit 325. For example, the calculated motion vector having the smallest (or largest) size may be taken as the motion vector of the best search result.

The predictive image generation unit 331 generates image data of the predictive image in which the image data of the reference image read from the reference image storing unit 329 is shifted by the motion vector output from the motion search unit 330. The predictive image generation unit 331 outputs the generated image data of the predictive image to the subtraction unit 322 and the addition unit 328.

The movement amount calculation unit 332 calculates the movement amount of an object (or subject and which may be referred to below as "object") captured by the imaging device 110 based, for example, on the CAN data. For example, the movement amount calculation unit 332 calculates the movement amount of the object based on the movement speed v of the vehicle 100, the observation interval time t, and the steering angle θ of the steering wheel included in the CAN data. An operation example of the calculation method is discussed in detail below. The movement amount of the object may be represented, for example, by coordinate positions (x,y,z) before the movement of the object and by coordinate positions (x',y',z') after the movement of the object. The movement amount calculation unit 332 outputs the calculated movement amount of the object to the image position calculation unit 333.

The image position calculation unit 333 sets, for example, a segmented region in the reference image and calculates coordinate positions before and after the movement of each vertex coordinate in the segmented region based on the movement amount of the object. At this time, the image position calculation unit 333 converts the vertices of the segmented region in a three-dimensional coordinate system to coordinate positions of a coordinate system in the image (or a two-dimensional coordinate system in the reference image). An operation example of the calculation method is discussed in detail below. The image position calculation unit 333 outputs the coordinate positions before and after the movement of the vertex coordinates of the segmented region to the reference image transformation unit 334 and the variable length encoding unit 325 as the expanded reference image transformation parameters.

The reference image transformation unit 334 uses the expanded reference image transformation parameters to calculate a determinant H which represents a homography transformation (or a projective transformation) in each segmented region. The reference image transformation unit 334 then uses the determinant H to perform homography transformation on the reference images read from the reference image storing unit 329 for each segmented region, synthesizes the transformed reference images, and generates image data of an expanded reference image of one frame. An operation example of the calculation method is discussed in detail below. The reference image transformation unit 334 outputs the generated image data of the expanded reference image to the motion search unit 330.

An encoding unit that uses the image data of the predictive image to compress and encode the image data to be encoded may be formed, for example, from the subtraction unit 322, the orthogonal transformation unit 323, the quantization unit 324, and the variable length encoding unit 325.

<Configuration Example of Decoding Processing Unit>

FIG. 3 illustrates a configuration example of the decoding processing unit 350. The decoding processing unit 350 is provided with a variable length decoding unit 351, an inverse quantization unit 352, an inverse orthogonal transformation unit 353, an addition unit 354, a reference image storing unit 355, an expanded reference image transformation unit (which may be referred to below as "reference image transformation unit") 356, and a predictive image generation unit 357.

The variable length decoding unit 351 performs variable length decoding processing on the compression stream read from the storage 340 and decodes the orthogonal components (e.g., DCT coefficients) of the original image data or the difference image data, the motion vector information, and the expanded reference image transformation parameters. The variable length decoding unit 351 outputs the decoded orthogonal components to the inverse quantization unit 352, the decoded vector information to the predictive image generation unit 357, and the decoded expanded reference image transformation parameters to the reference image transformation unit 356.

The inverse quantization unit 352 multiplies the orthogonal components of the original image data or the difference image data by the quantization step used by the quantization unit 324 of the encoding processing unit 320, and calculates the orthogonal components of the original image data or the difference image data before the quantization by the encoding processing unit 320. The inverse quantization unit 352 outputs the calculated orthogonal components of the original image data or the difference image data to the inverse orthogonal transformation unit 353.

The inverse orthogonal transformation unit 353 uses, for example, a predetermined arithmetic equation on the orthogonal components of the original image data or the difference image data, performs inverse orthogonal transformation (e.g., inverse DCT transformation), and calculates the original image data or the difference image data before the orthogonal transformation. The inverse orthogonal transformation unit 353 outputs the calculated original image data or difference image data to the addition unit 354.

The addition unit 354 outputs the original image data as-is without adding the original image data to the image data of the predictive image when the original image data is output from the inverse orthogonal transformation unit 353. In addition, the addition unit 354 adds together the difference image data and the image data of the predictive image output from the predictive image generation unit 357 and outputs the data when the output from the inverse orthogonal transformation unit 353 is the difference image data. As a result, the original image data of the original image corresponding to the I-picture, for example, is output as-is as decoded image data, and the difference image corresponding to the B-picture or P-picture is added to the predictive image and the added image data is output as the decoded image data. The addition unit 354 stores the original image data and the added image data in the reference image storing unit 355 as image data of the reference image.

The reference image storing unit 355 stores the image data of the reference image output from the addition unit 354. The image data stored in the reference image storing unit 355 can be read appropriately from the reference image storing unit 355 by the reference image transformation unit 356 and the predictive image generation unit 357.

The reference image transformation unit 356 calculates the determinant H to be used in the homography transformation based on the expanded reference image transformation parameters, and uses the determinant H to perform homography transformation on the image data of the reference image read from the reference image storing unit 355. In this case, the vertex coordinates before and after the movement in the segmented regions are included in the expanded reference image transformation parameters. As a result, the reference image transformation unit 356 performs homography transformation on the reference images for each segmented region in the same way as the reference image transformation unit 334 of the encoding processing unit 320, synthesizes the transformed reference images and sets the reference images as an image of one frame, thereby generating the image data of the expanded reference image. The reference image transformation unit 356 outputs the generated image data of the expanded reference image to the predictive image generation unit 357.

The predictive image generation unit 357 generates image data of the predictive image in which the image data that is shifted by the motion vectors included in the motion vector information with regard to the image data of the expanded reference image or the image data of the reference image read from the reference image storing unit 355. The predictive image generation unit 357 outputs either the image data of the image shifted by the motion vectors with regard to the image data of the expanded reference image, or the image data of the image shifted by the motion vectors with regard to the image data of the reference image, to the addition unit 354.

Operation Examples

Examples of operations will be discussed next. The operation examples will be discussed in the following order.

<1. Example of images captured by the imaging device>
<2. Encoding processing>
<2.1 Movement amount calculation processing>

<2.2 Before/after movement image position calculation processing>

<2.3 Expanded reference image transformation processing>

<3. Decoding processing>

<1. Example of Images Captured by the Imaging Device>

Figure 4A:
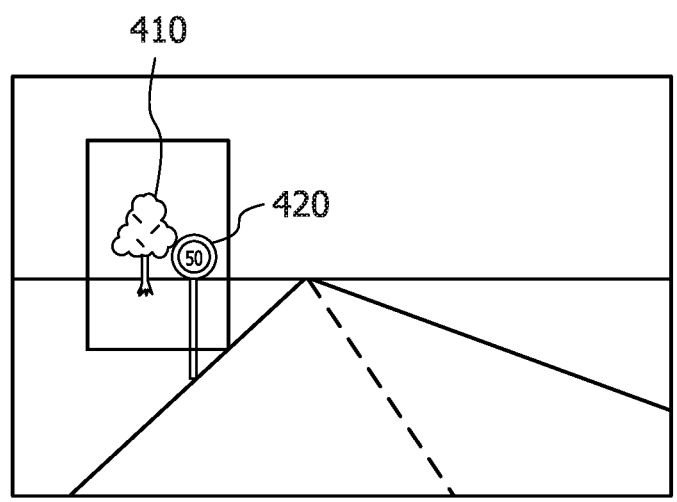
FIGS. 4A and 4B illustrate examples of images.
Figure 4B:
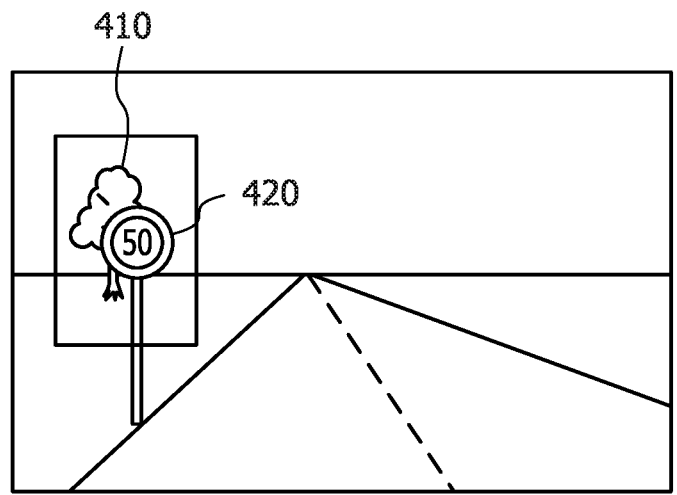

FIG. 4A depicts an example of an image captured by the imaging device 110 mounted to the vehicle 100, and FIG. 4B depicts an example of an image of the image in FIG. 4A after the observation interval time t has elapsed.

A tree 410 and a sign 420 included within the square frame can be seen in the image depicted in FIG. 4A. In this case, when comparing the distance of the tree 410 from the vehicle 100 and the distance of the sign 420 from the vehicle 100, the former is further away than the latter.

Therefore, after the observation interval time t has elapsed, the magnification rate of the sign 420 is greater than the magnification rate of the tree 420 as can be seen in FIG. 4B. FIG. 5B depicts an example of the positional relationships of the tree 410 and the sign 420 with the vehicle 100.

For example, a case is assumed where the tree 410 and the sign 420 are magnified with the same magnification rate when focusing on the square frame when the reference image is FIG. 4A.

Figure 5A:
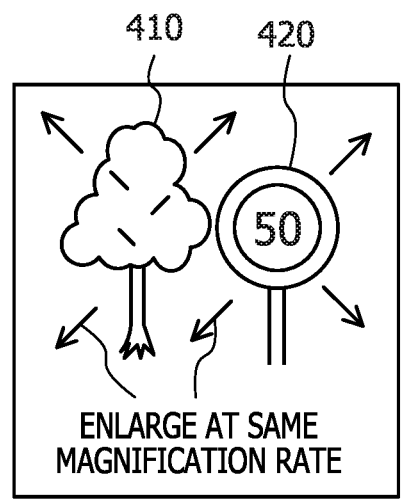
FIG. 5A illustrates an example of an image after an enlargement.
Figure 5B:
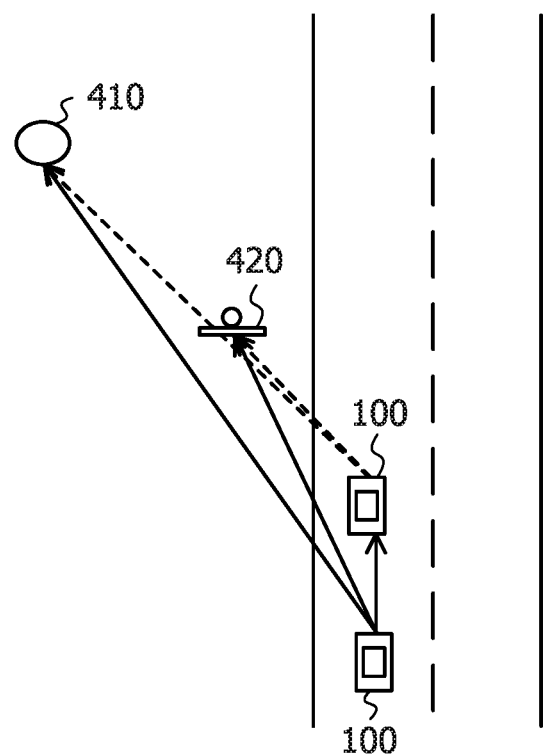
FIG. 5B illustrates examples of the relationship between a tree, a sign, and a vehicle.

FIG. 5A depicts an example of the image within the frame when the tree 410 and the sign 420 are magnified at the same magnification rate. When comparing a case where the image depicted in FIG. 5A is used as the reference image, and a case where the image depicted within the square frame in FIG. 4B, the image that uses the reference image depicted in FIG. 4B clearly conforms more closely to the actual image. This is based on the difference between the distance from the vehicle 100 to the tree 410 and the distance from the vehicle 100 to the sign 420. Specifically, the distance from the vehicle 100 to the tree 410 is greater than the distance from the vehicle 100 to the sign 420, and the tree 410 would not be magnified as much as the sign 420 even after the observation interval time t has elapsed. Conversely, because the distance from the vehicle 100 to the sign 420 is less than the distance to the tree 410, the sign 420 is magnified to a greater extent than the tree 410 even after the observation interval time t has elapsed. When a plurality of objects (the tree 410 and the sign 420) are present in an image, the magnification rate of each object differs.

According to a first embodiment, an expanded reference image (e.g., FIG. 4B) is generated by the encoding processing unit 320 in which modification is performed on a reference image (e.g., FIG. 4A) in consideration of the magnification rate of each object. Searching of a motion vector is then performed based on the expanded reference image and the image to be encoded (e.g., FIG. 4B) in the encoding processing unit 320. As a result for example, the expanded reference image has a higher concordance rate with the image to be encoded than a reference image that is uniformly magnified (e.g., FIG. 5A) in the encoding processing unit 320. By improving the concordance rate, a more precise motion vector can be calculated when using the expanded reference image to search for a motion vector than when using a uniformly magnified reference image to search for a motion vector.

<2. Encoding Processing>

Figure 6:
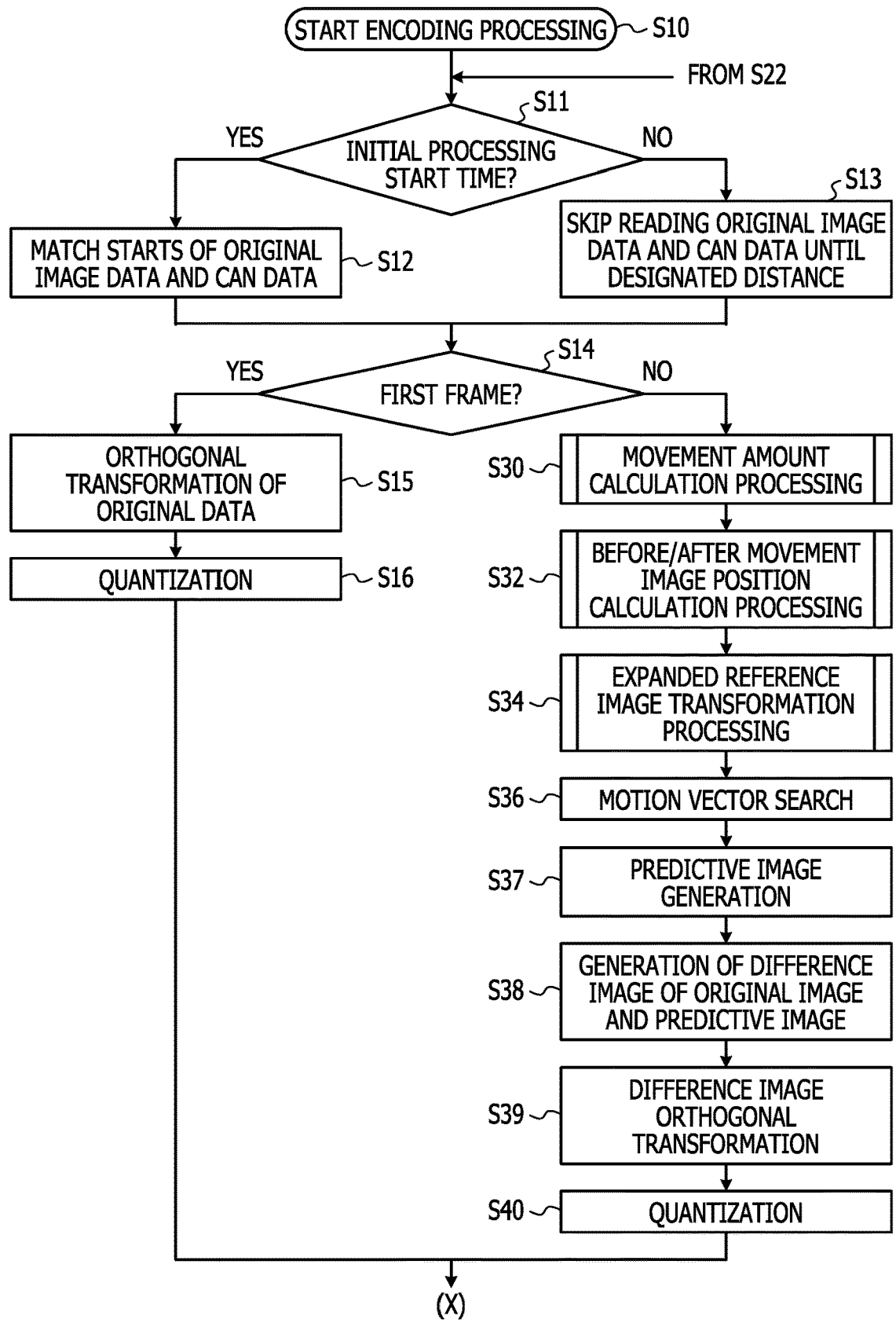
FIG. 6 is a flow chart of an example of encoding processing.
Figure 7:
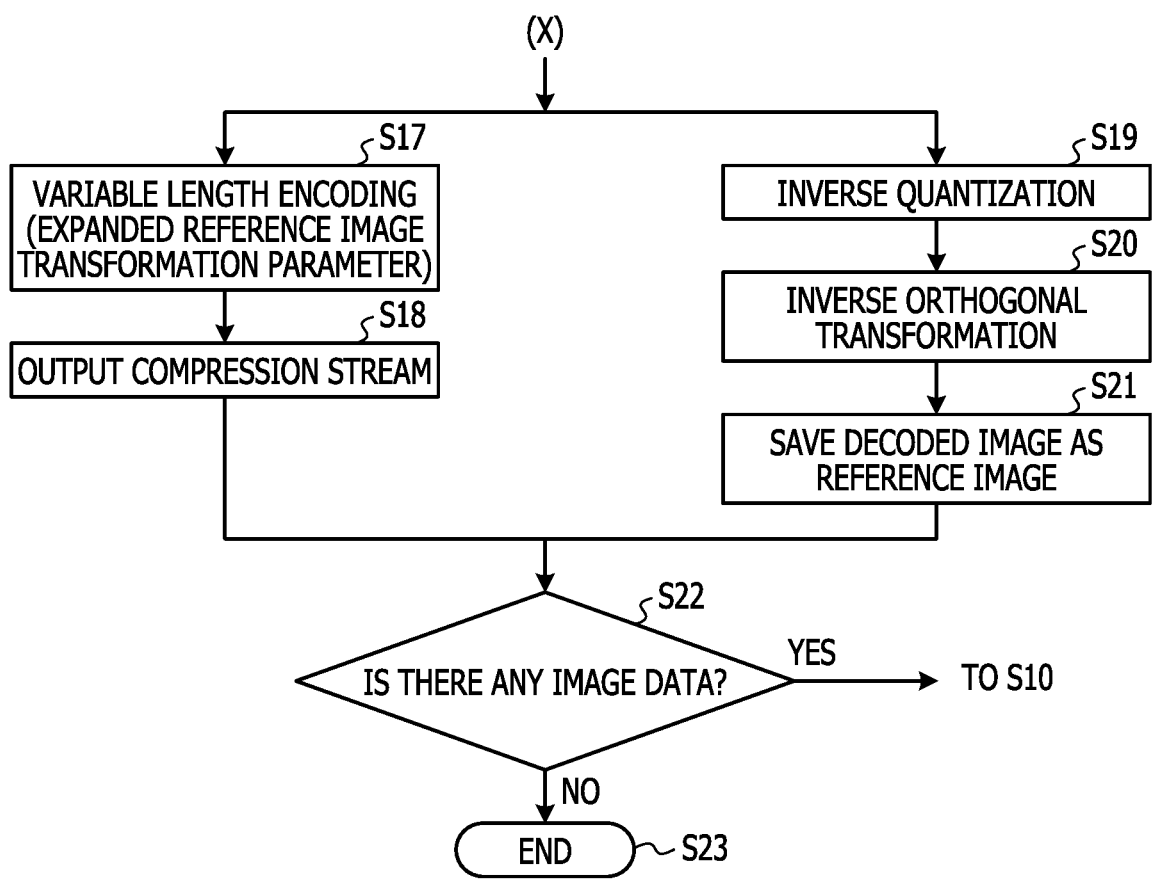
FIG. 7 is a flow chart of an example of decoding processing.

FIGS. 6 and 7 are flow charts depicting examples of decoding processing.

As illustrated in FIG. 6, the encoding processing unit 320 starts the processing (S10) such as inputting the original image data, and determines whether the processing is the start of initial processing (S11). For example, the encoding processing unit 320 performs the following processing. Specifically, the original image sub-sampling unit 321 measures the input timing of the original image data, and if the original image data is being input the first time, or if the original image data has been input after a suitable period of time has elapsed after the previous processing, the original image sub-sampling unit 321 determines that the processing is the start of initial processing (S11: Yes). Conversely, in any other case, the original image sub-sampling unit 321 determines that the processing is not the start of initial processing (S11: No).

When the processing is determined as the start of initial processing (S11: Yes), the encoding processing unit 320 matches the starts of the original image data and the CAN data (S12). For example, the original image sub-sampling unit 321 outputs the original image data at a timing at which the time information included in the original image data and the time information included in the CAN data match each other.

Conversely, when the timing is not the start of initial processing (S11: No), the encoding processing unit 320 skips reading the original image data and the CAN data (S13) until a designated distance. For example, the original image sub-sampling unit 321 samples during prescribed frames and outputs the input original image data so as to conform to the movement amount output from the movement amount calculation unit 332. Alternatively, the original image sub-sampling unit 321 may calculate, for example, a movement distance l of the vehicle 100 based on the data included in the CAN data, discard the input original image data until the calculated movement distance l matches the designated distance, and output input the original image data when there is a match.

When the processing in S12 or S13 is finished, the encoding processing unit 320 determines whether the input original image data is a first frame (S14). For example, the subtraction unit 322 counts the number of frames of the input original image data and determines whether the count value is "1" or not. In this case, the subtraction unit 322 clears the count value when the number of frames becomes a number of frames that is a group of pictures (GOP) (e.g., 15 frames or 30 frames), and starts counting again in order from the first frame.

If the original image data is the first frame (S14: Yes), the encoding processing unit 320 performs orthogonal transformation on the original image data (S15). For example, when the count value is "1," the subtraction unit 322 outputs the original image data without performing addition to the orthogonal transformation unit 323, and the orthogonal transformation unit 323 performs orthogonal transformation on the original image data. The first frame is, for example, an intra-frame and the encoding processing unit 320 performs intra-frame encoding processing as described below on the first frame of the original image data.

Specifically, the encoding processing unit 320 performs quantization processing on the orthogonal component (or transformation coefficient) of the original image data in the first frame after the orthogonal transformation (S16). For example, the quantization unit 324 generates a quantization value in which the result of dividing the transformation coefficient output from the orthogonal transformation unit 323 by a quantization step is rounded off to an integer.

The encoding processing unit 320 then performs variable length encoding processing on the quantization value (S17 in FIG. 7). For example, the variable length encoding unit 325 uses an encoding system such as CABAC to perform the variable length encoding processing on the quantization value.

The encoding processing unit 320 then outputs the compression stream to the storage 340 (S18).

In addition, the encoding processing unit 320 performs the quantization processing on the quantization value (S16) thereby calculating a transformation coefficient before quantization (S19), and performs inverse orthogonal transformation on the calculated transformation coefficient thereby decoding the original image data of the original image (S20). The encoding processing unit 320 saves the original image data of the original image that is the decoded image in the reference image storing unit 329 as the image data of the reference image (S21).

When the processing in S18 and S20 is finished, the encoding processing unit 320 determines if there is any image data (S22), and if there is image data (S22: Yes), the routine switches to S10. If there is no image data (S22: No), the encoding processing is finished (S23). For example, the original image sub-sampling unit 321 may determine that there is no image data based on the presence or absence of an original image data input.

Conversely, when the original image data is not the original image data of the first frame (S14: No), the encoding processing unit 320 performs movement amount calculation processing (S30).

<2.1 Movement Amount Calculation Processing>

Figure 8:
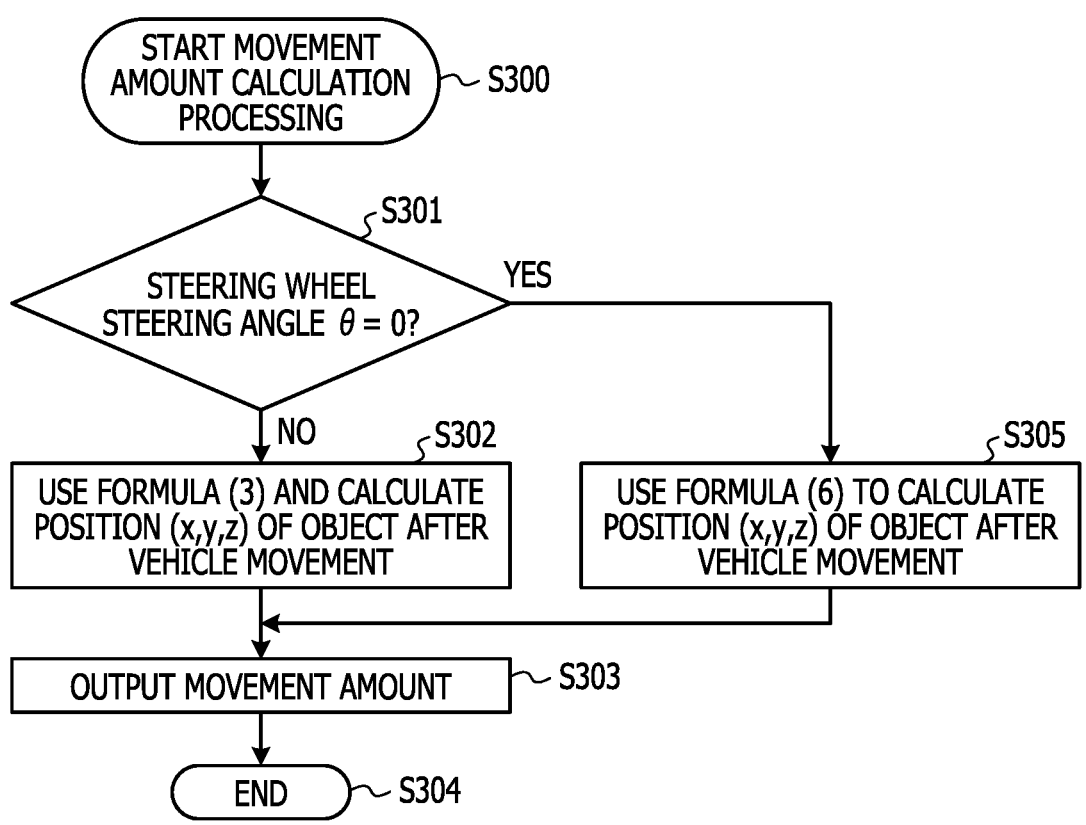
FIG. 8 is a flow chart of an example of movement amount calculation processing.

FIG. 8 is a flow chart of an example of movement amount calculation processing.

When the movement amount calculation processing starts (S300), the encoding processing unit 320 determines whether the steering angle θ of the steering wheel is "0" or not based on the CAN data (S301). For example, the movement amount calculation unit 332 makes the determination based on whether or not the steering angle θ of the steering wheel extracted from the CAN data is "0" or not.

When the steering angle θ of the steering wheel is not "0" (S301: No), the encoding processing unit 320 uses the following formula (3) to calculate the position (x',y',z') of the object after the vehicle movement (S302).

Figure 9:
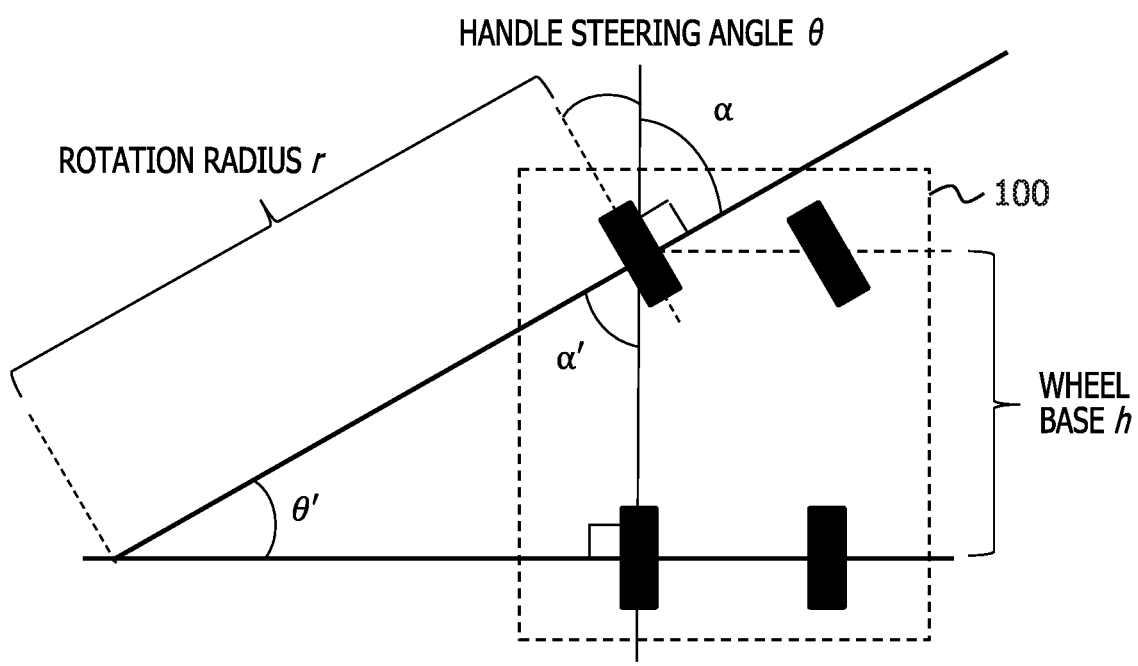
FIG. 9 illustrates an example of a relationship between steering wheel steering and a rotation radius.

FIG. 9 illustrates an example of the relationship between the steering angle θ of the steering wheel and a turning radius r. The turning radius r represents, for example, the radius of a circle drawn by the vehicle 100 when the vehicle 100 is traveling with the steering angle of the steering wheel set as θ. However, it is assumed here that the tires of vehicle 100 are fully in contact with the road surface and there is no over-steering or under-steering.

As illustrated in FIG. 9, based on the vertical angle relationship of α and α', α=α' and θ=θ'. Therefore, α+θ=α'+θ'=π/2 is obtained. When modified, sin θ=sin θ'=h/r. Therefore, turning radius r becomes:

$$r = \frac{H}{\sin\theta} \quad (1)$$

Figure 10A:
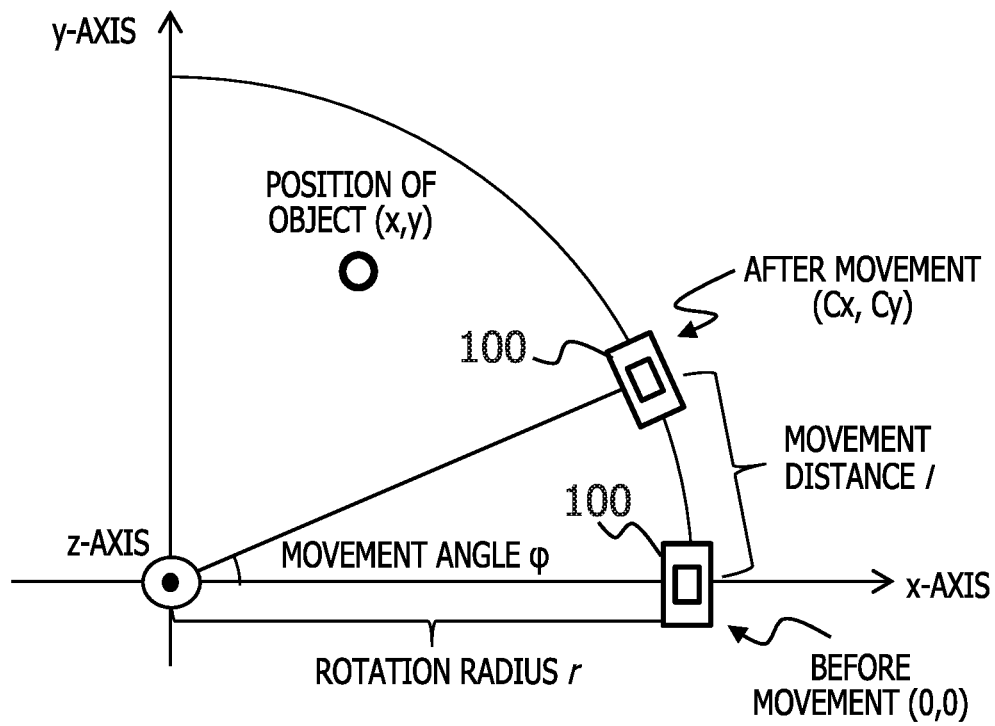
FIGS. 10A and 10B illustrate examples of positional relationships before and after the movement of a vehicle.
Figure 10B:
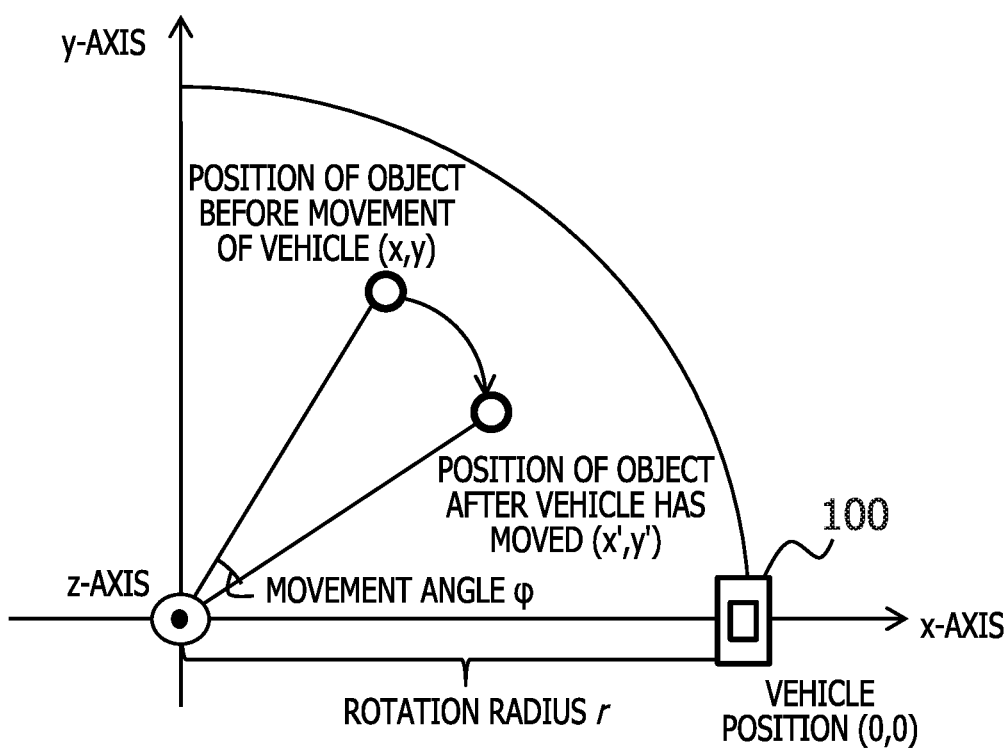

FIG. 10A illustrates a movement example of the vehicle 100, and FIG. 10B illustrates a movement example of an object in the coordinate system of the vehicle.

In FIGS. 10A and 10B, the horizontal axis is the x-axis, the vertical axis is the y-axis, and the axis looking upward from the drawing (or the axis of the direction opposite the direction that gravity works in) is the z-axis. Although each position is depicted in two dimensions (x,y) in FIGS. 10A and 10B in the discussion, the positions are actually depicted in three dimensions (x,y,z).

As illustrated in FIG. 10A, the vehicle 100 is positioned at (0,0) before moving and then moves to (Cx,Cy) after a time t has elapsed. In this case, the vehicle 100 has a steering wheel steering angle that is θ, and the movement distance around the point of contact of the x-axis, the y-axis, and the z-axis is L, and the movement angle is φ. The movement angle φ is derived with the following formula (2) when using the movement distance l, the turning radius r, and formula (1).

$$\varphi = \frac{l}{r} = \frac{vt \cdot \sin\theta}{H} \quad (2)$$

FIG. 10B illustrates the movement amount of the object in the vehicle coordinate system. The movement of the vehicle 100 itself depicted in FIG. 10B is the same as that of FIG. 10A. However, FIG. 10B depicts an example with the position of the vehicle 100 set as (0,0) (or (0,0,0) when depicted as three dimensions) regardless of before or after the movement of the vehicle 100. When the position of the vehicle 100 itself is set to (0,0) even if the vehicle 100 has moved, the coordinate system that depicts how much an object in the vicinity of the vehicle 100 has moved becomes, for example, the vehicle coordinate system. When the vehicle 100 actually moves by the movement angle φ as depicted in FIG. 10A, although the position (x,y) itself of the object does not change, when looking at the vehicle coordinate system, the position of the object moves from (x,y) to (x',y') as illustrated in FIG. 10B. However, the movement angle φ does not change in the case depicted in FIG. 10A or in the case depicted in FIG. 10B.

In the vehicle coordinate system, when the position of the object before the vehicle 100 moves is set to (x,y,z) and the position of the object after the vehicle 100 has moved is set to (x',y',z'), (x',y',z') is represented as:

$$\begin{pmatrix} x' \\ y' \\ z' \\ 1 \end{pmatrix} = \begin{pmatrix} \cos(-\varphi) & -\sin(-\varphi) & 0 & -r \\ \sin(-\varphi) & \cos(-\varphi) & 0 & 0 \\ 0 & 0 & 1 & 0 \\ 0 & 0 & 0 & 1 \end{pmatrix} \begin{pmatrix} 1 & 0 & 0 & r \\ 0 & 1 & 0 & 0 \\ 0 & 0 & 1 & 0 \\ 0 & 0 & 0 & 1 \end{pmatrix} \begin{pmatrix} x \\ y \\ z \\ 1 \end{pmatrix} \quad (3)$$

In formula (3), the following formula (4)

$$\begin{pmatrix} 1 & 0 & 0 & r \\ 0 & 1 & 0 & 0 \\ 0 & 0 & 1 & 0 \\ 0 & 0 & 0 & 1 \end{pmatrix} \quad (4)$$

depicts, for example, a parallel translation of the coordinate position. As illustrated in FIG. 10B, when the coordinate position of the vehicle 100 is taken as (0,0,0), the contact point of the x-axis, the y-axis, and the z-axis becomes (−r,0,0) and the object moves around the contact point. If the coordinate position of the vehicle 100 is taken as (r,0,0), because the contact point becomes the point of origin (0,0,0), the coordinate position of the vehicle 100 is subjected to parallel translation from (0,0,0) to (r,0,0), whereby the contact point of the x-axis, the y-axis, and the z-axis can be taken as the point of origin (0,0,0) and the movement angle φ can be expressed as an angle centered on the point of origin.

In formula (3), the following formula (5)

$$\begin{pmatrix} \cos(-\varphi) & -\sin(-\varphi) & 0 & -r \\ \sin(-\varphi) & \cos(-\varphi) & 0 & 0 \\ 0 & 0 & 1 & 0 \\ 0 & 0 & 0 & 1 \end{pmatrix} \quad (5)$$

represents, for example, a parallel translation and a rotation of the coordinate position.

Within the determinant that is formula (5), the fourth column (column that includes −r) represents the parallel translation. Specifically, according to formula (4), the point of origin is subjected to parallel translation in the X-axis direction by "r", and when this is returned to the original, the determinant in formula (5) represents processing for causing the parallel translation of the point of origin in the X-axis direction by "−r". As a result, the position of the vehicle 100, for example, is returned to the point of origin (0,0,0).

In addition, the first to third columns within the determinant in formula (5) depict a rotating matrix for rotating the x-axis and the y-axis in the direction of −φ around the z-axis. Formula (5) as a whole depicts causing the rotation of the contact point of the x-axis, the y-axis, and the z-axis by movement angle φ around the z-axis as the point of origin, and thereafter causing the parallel translation of the point of origin from the contact point to the position of the vehicle 100.

The movement amount calculation unit 332 performs, for example, the following processing. Specifically, the movement amount calculation unit 332 holds formula (2) and formula (3) in an internal memory. When the steering angle θ of the steering wheel is confirmed as not being "0", the movement amount calculation unit 332 incorporates the speed v of the vehicle 100, the observation interval time t, and the steering angle θ of the steering wheel into formula (2) and calculates the movement angle φ. The movement amount calculation unit 332 then incorporates the calculated movement angle φ into formula (3) and calculates the coordinate position (x',y',z') of the object after the movement of the vehicle 100 with respect to the coordinate position (x,y,z) of the object before the movement of the vehicle 100.

While formula (3) is depicted in four dimensions as (x',y',z',1), the "1" in the fourth row on the left side of formula (3) is inserted in order to represent the determinant representing not only the rotating matrix but also the parallel translation in the first determinant among the determinants in formula (3).

Returning to FIG. 8, the encoding processing unit 320 then outputs the movement amount (S303). For example, the movement amount calculation unit 332 outputs (x,y,z) and (x',y',z') as the movement amounts to the image position calculation unit 333 and the original image sub-sampling unit 321.

The encoding processing unit 320 then finishes the movement amount calculation processing (S304).

Conversely, when the steering angle θ of the steering wheel is "0" (S301: Yes), the encoding processing unit 320 uses formula (6) to calculate the position (x',y',z') of the object after the vehicle movement (S305).

Figure 11A:
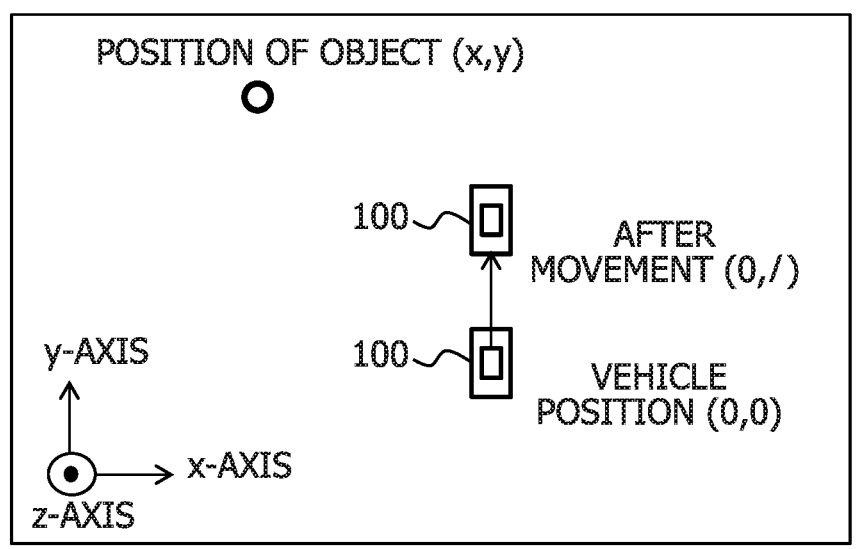
FIGS. 11A and 11B illustrate examples of positional relationships before and after the movement of a vehicle.
Figure 11B:
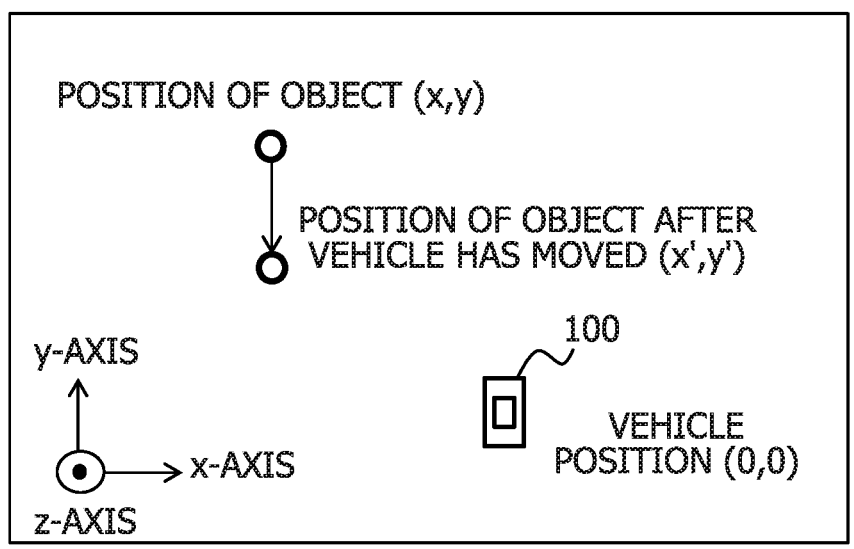

FIG. 11A illustrates a movement example of the vehicle 100 when the steering angle θ of the steering wheel is "0". In addition, FIG. 11B illustrates a movement example of an object in the vehicle coordinate system when the steering angle θ of the steering wheel is "0".

As illustrated in FIG. 11A, when the steering angle θ is "0", the position of the vehicle 100 after the observation interval time t has elapsed changes from (0,0) to (0,l), where l=vt. Therefore as illustrated in FIG. 11B, the position of the object changes from (x,y) to (x',y') in the vehicle coordinate system. When the above is represented in three-dimensional coordinates, the position (x',y',z') of the object after the movement of the vehicle can be represented by the following formula (6) with respect to the position (x,y,z) of the object before the movement of the vehicle.

$$\begin{pmatrix} x' \\ y' \\ z' \\ 1 \end{pmatrix} = \begin{pmatrix} 1 & 0 & 0 & 0 \\ 0 & 1 & 0 & -vt \\ 0 & 0 & 1 & 0 \\ 0 & 0 & 0 & 1 \end{pmatrix} \begin{pmatrix} x \\ y \\ z \\ 1 \end{pmatrix} \quad (6)$$

The determinants represented in formula (6) express the rotation with the first to third rows, and the parallel translation with the fourth row. In this case, because the steering angle θ is "0", the vehicle 100 does not rotate and the rotating matrix is expressed with a unit matrix in the first to third rows. In addition, because the movement of the object moves by "−vt" in the y-axis direction as illustrated in FIG. 11B, the second row in the fourth row in formula (6) becomes "−vt".

The movement amount calculation unit 332 performs, for example, the following processing. Specifically, when the steering angle θ of the steering wheel is confirmed to be "0" from the CAN data, the movement amount calculation unit 332 reads the formula (6) stored in the internal memory and incorporates the speed v of the vehicle 100 and the observation interval time t included in the CAN data into formula (6) and calculates the coordinate position (x',y',z') of the object after the movement of the vehicle.

Returning to FIG. 8, the encoding processing unit 320 then outputs the calculated movement amount (S303). For example, the movement amount calculation unit 332 outputs (x,y,z) and (x',y',z') calculated in formula (6) to the image position calculation unit 333.

The encoding processing unit 320 then finishes the movement amount calculation processing (S304).

Returning to FIG. 6, when the movement amount calculation processing (S30) is finished, the encoding processing unit 320 performs the before/after movement image position calculation processing (S32).

<2.2 Before/after Movement Image Position Calculation Processing>

Figure 12:
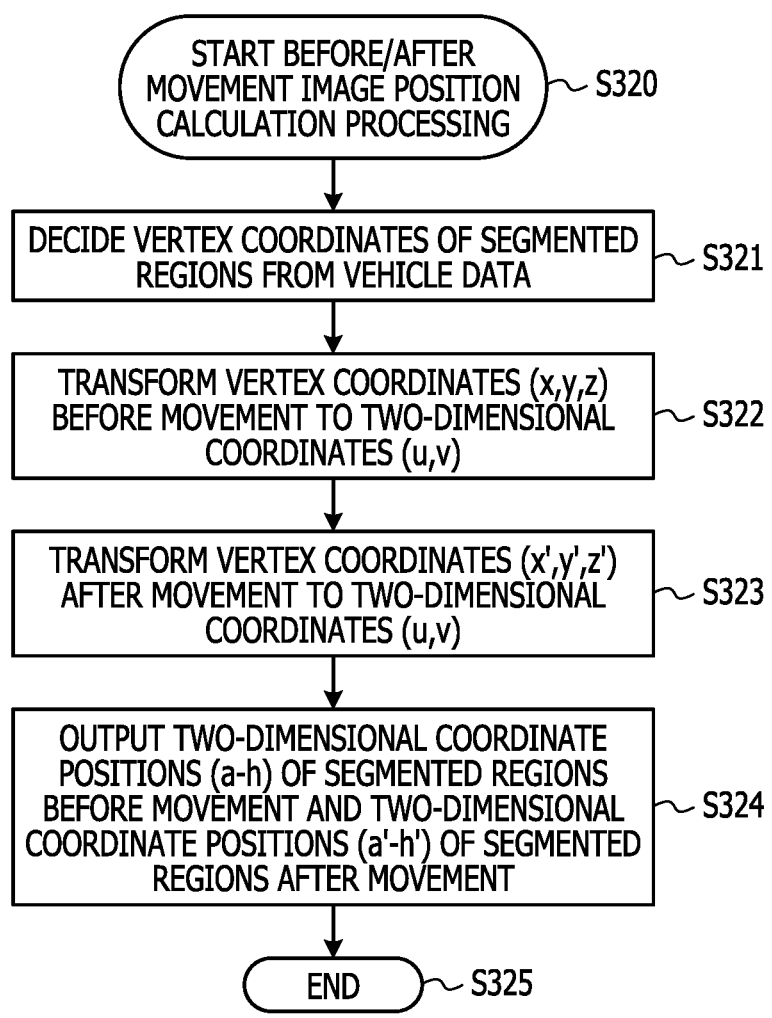
FIG. 12 is a flow chart of an example of before/after movement image position calculation processing.

FIG. 12 is a flow chart illustrating an example of the before/after movement image position calculation processing (which may be referred to below as "image position calculation processing").

When the image position calculation processing starts (S320), the encoding processing unit 320 decides each vertex coordinate in the segmented regions from the vehicle data (S321). In the image position calculation processing, the segmented regions are set in the reference image as illustrated, for example in FIG. 14. The downstream reference image transformation unit 334 performs homography transformation on the reference image in each segmented region. In the image position calculation processing, the processing for setting the segmented regions is performed first in the processing.

Figure 13:
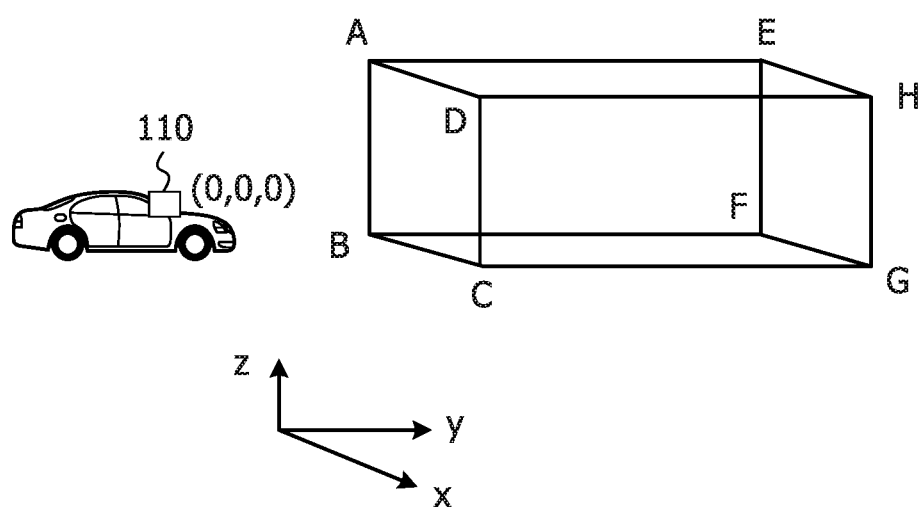
FIG. 13 illustrates an example of the relationship between a vehicle and a segmented region.

FIG. 13 illustrates an example of a segmented region set in the vehicle 100. The position of the imaging device 110 is set to the point of origin (0,0,0), the vertex coordinates of a quadrilateral near the imaging device 110 are represented as A, B, C and D, and the vertex coordinates of a quadrilateral further away from the imaging device 110 are represented as E, F, G and H. While the two quadrilaterals ABCD and EFGH have the same size in FIG. 13, the two quadrilaterals ABCD and EFGH as seen from the imaging device 110 are displayed, for example, so that the quadrilateral ABCD is large and the quadrilateral EFGH is small as illustrated in FIG. 14.

Figure 14:
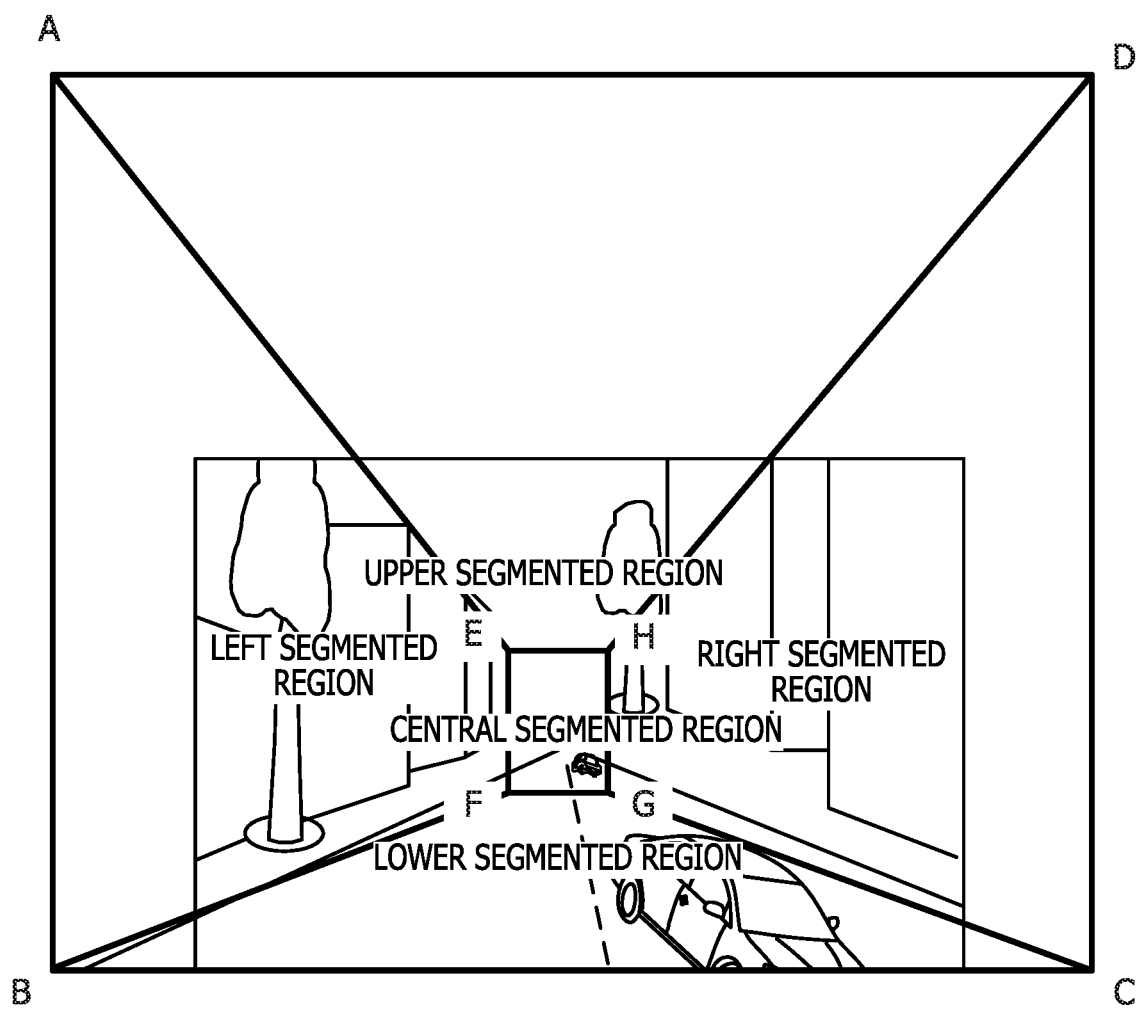
FIG. 14 illustrates an example of a segmented region.

The segmented regions in FIG. 14 are made up of, for example, five regions including an upper segmented region, a right segmented region, a lower segmented region, a left segmented region, and a central segmented region.

The upper segmented region is the region represented by vertex coordinates ADHE. The upper segmented region, for example, is a region in which buildings or the sky are captured.

The right segmented region is the region represented by vertex coordinates CDHG. The left segmented region is the region represented by the vertex coordinates ABFE. The right and left segmented regions, for example, are regions in which buildings or sidewalks are captured.

The lower segmented region is the region represented by vertex coordinates BCGF. The lower segmented region, for example, is a region in which the road surface is captured.

The central segmented region is the region represented by vertex coordinates EFGH. The central segmented region is a plane in a region spaced away from the vehicle 100, for example, by a prescribed distance. The central segmented region, for example, is the region including the center point of the reference image.

The image position calculation unit 333 determines the vertex coordinates A to H of the segmented regions from, for example, information such as the height of the camera included on the vehicle data. Examples of the vertex coordinates A to H include A(−3,1.5,9), B(−3,1.5,−1), C(5,1.5,−1), D(5,1.5,9), E(−3,100,9), F(−3,100,−1), G(5,100,−1) and H(5,100,9).

In addition, the image position calculation unit 333 determines the vertex coordinates A' to H' of the segmented regions after the vehicle 100 has moved. For example, while the vertex coordinates A to H before movement of the vehicle 100 are represented in the example in FIG. 13, the vertex coordinates A' to H' after the vehicle 100 has moved are also present. The image position calculation unit 333 calculates, for example, the vertex coordinates A' to H' based on the vehicle data after the movement of the vehicle.

The image position calculation unit 333 may, for example, hold the coordinate positions of the vertex coordinates A-H and A'H' as fixed values in an internal memory, or may read the coordinate positions of the vertex coordinates A-H and A'-H' from the internal memory during the processing.

The vertex coordinates A-H of the segmented regions depicted in FIG. 14 are examples and may be other numerical values, the vertices ABCD may match the four vertices of the frame of the reference image, or the vertices ABCD may be inside the frame of the reference image.

Returning to FIG. 12, the encoding processing unit 320 then transforms the vertex coordinates (x,y,z) before movement to a two-dimensional coordinate system (u,v) on the image (S322). For example, the image position calculation unit 333 uses the following formula (7) to transform the vertex coordinates (x,y,z) to the coordinates (u,v).

$$s \begin{pmatrix} u \\ v \\ 1 \end{pmatrix} = \begin{pmatrix} f_x & 0 & c_x \\ 0 & f_y & c_y \\ 0 & 0 & 1 \end{pmatrix} \begin{pmatrix} r_{11} & r_{12} & r_{13} & t_1 \\ r_{21} & r_{22} & r_{23} & t_2 \\ r_{31} & r_{32} & r_{33} & t_3 \end{pmatrix} \begin{pmatrix} x \\ y \\ z \\ 1 \end{pmatrix} \quad (7)$$

The second determinant on the right side in formula (7)

$$\begin{pmatrix} r_{11} & r_{12} & r_{13} & t_1 \\ r_{21} & r_{22} & r_{23} & t_2 \\ r_{31} & r_{32} & r_{33} & t_3 \end{pmatrix} \quad (8)$$

represents, for example, the transformation from the vehicle coordinate system (e.g., the center of the vehicle 100 being the point of origin) to a coordinate system of the imaging device 110 (e.g., the position of the imaging device 110 being the point of origin). Formula (8) expresses a transformation being performed by rotation (first to third columns) and parallel translation (fourth column).

The first determinant on the right side in formula (7)

$$\begin{pmatrix} f_x & 0 & c_x \\ 0 & f_y & c_y \\ 0 & 0 & 1 \end{pmatrix} \quad (9)$$

expresses, for example, the parallel translation to a principal point (or the center point of the image) cx,cy and the enlargement or reduction of a focal length fx,fy.

Figure 17A:
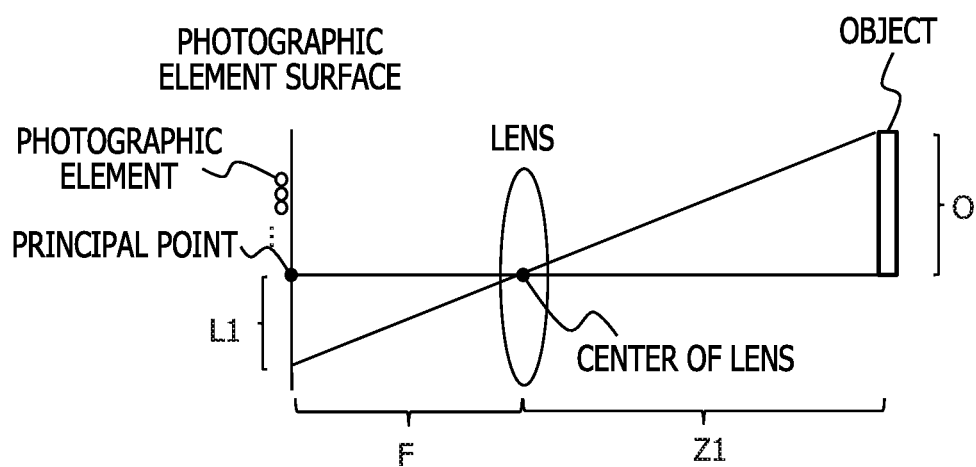
FIGS. 17A and 17B illustrate examples of the relationships between the actual size of an object and the size of an object reflected on an imaging element surface.

The principal point represents, for example, a contact point of an optical axis of the image incident to the imaging device 110 and an imaging element in the imaging device 110. An example of the principal point is illustrated in FIG. 17A. In the first embodiment, the principal point is taken as, for example, the center point of the image. The x-coordinate and the y-coordinate of the principal point are respectively represented as cx,cy. In the segmented regions illustrated in FIG. 14, the center point of the image is included in the central segmented region EFGH.

In formula (9), the focal length fx,fy represents, for example, the shortest distance between the surface of the imaging element in the imaging device 110 and the center point of the lens, and the x-axis direction of fx and the y-axis direction of fy represent the shortest distances.

The image position calculation unit 333 performs, for example, the following processing. Specifically, the image position calculation unit 333 stores formula (7) in an internal memory. The image position calculation unit 333 acquires the position (x,y,z) of the object before the vehicle movement from the movement amount calculation unit 332, reads the formula (7), and incorporates the acquired (x,y,z) into formula (7) thereby deriving (u,v). At this time, the image position calculation unit 333 incorporates the vertex coordinates A-H of the segmented region into formula (7) as the position (x,y,z) of the object before the vehicle movement. Specifically, the image position calculation unit 333 incorporates A(−3,1.5,9) as (x,y,z) into formula (7) and transforms the position to a two-dimensional coordinate a (u,v). The image position calculation unit 333 similarly incorporates the other vertex coordinates B-H into formula (7) thereby deriving the two-dimensional coordinate system b-h. Therefore, the image position calculation unit 333 incorporates the vertex coordinates A-H of the segmented region into formula (7) and calculates the coordinate positions a-h on the image.

Returning to FIG. 12, the encoding processing unit 320 then converts the vertex coordinates (x',y',z') after the vehicle movement to a two-dimensional coordinate system (u',v') on the image (S323).

The image position calculation unit 333 performs, for example, the following processing. Specifically, the image position calculation unit 333 reads formula (7) stored in the internal memory and incorporates the position (x',y',z') of the object after the vehicle movement acquired from the movement amount calculation unit 332, thereby deriving the two-dimensional coordinates (u',v') on the image. At this time, the image position calculation unit 333 incorporates the vertex coordinates A'-H' of the segmented region into (x,y,z) in formula (7) as the position (x',y',z') of the object before the vehicle movement. Specifically, the image position calculation unit 333 incorporates the coordinates (x',y',z') of A' into formula (7) and transforms the three-dimensional coordinate A' into the two-dimensional coordinate a' (u',v'). The image position calculation unit 333 similarly incorporates the other vertex coordinates B'-H' into formula (7) and derives the two-dimensional coordinates b'-h'. Therefore, the image position calculation unit 333 incorporates the vertex coordinates A'-H' of the segmented regions into formula (7) and calculates the respective coordinate positions a'-h' on the image.

Figure 15A:
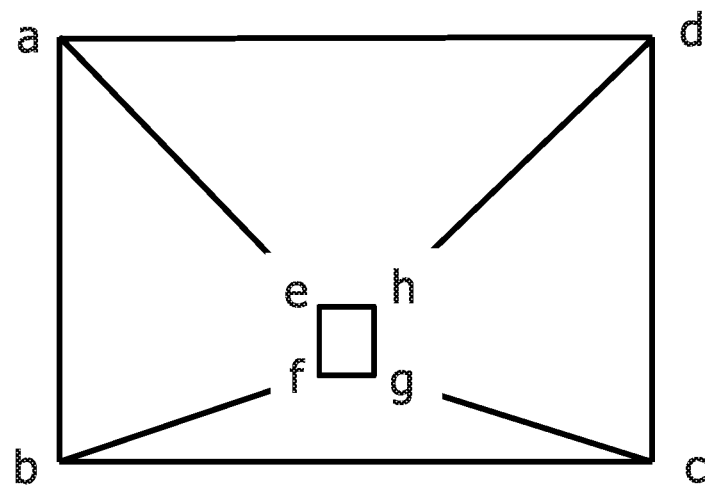
FIGS. 15A and 15B illustrate examples of segmented regions.
Figure 15B:
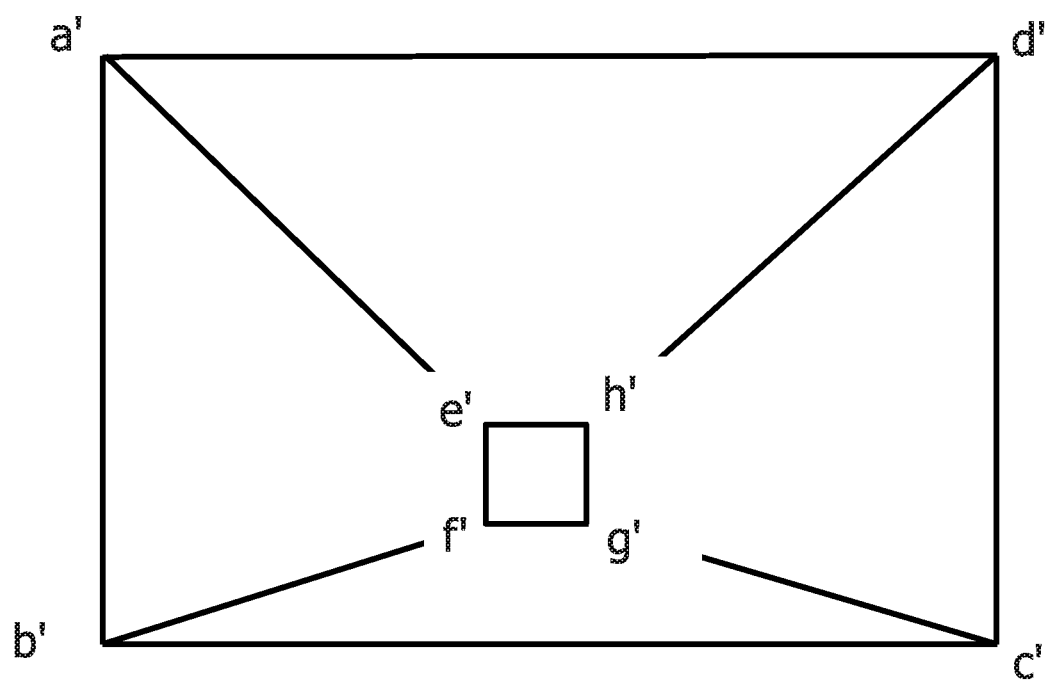

FIG. 15A illustrates examples of the vertex coordinates a-h of the segmented regions before the vehicle movement and FIG. 15B illustrates examples of the vertex coordinates a'-h' of the segmented regions after the vehicle movement.

Returning to FIG. 12, the encoding processing unit 320 then outputs the vertex coordinates a-h and a'-h' of the segmented regions after the transformation (S324). For example, the image position calculation unit 333 outputs the vertex coordinates a-h and a'-h' of the segmented regions after the transformation to the reference image transformation unit 334.

The encoding processing unit 320 then finishes the before/after movement image position calculation processing (S325).

Returning to FIG. 6, when the before/after movement image position calculation processing is finished (S32), the encoding processing unit 320 performs the expanded reference image transformation processing (S34).

<2.3 Expanded Reference Image Transformation Processing>

FIG. 16 is a flow chart of an example of the expanded reference image transformation processing.

When the above processing starts (S340), the encoding processing unit 320 calculates the determinant H representing homography transformation from the vertex coordinates a-h and a'-h' of the segmented region before and after the movement (S341).

Figure 19:
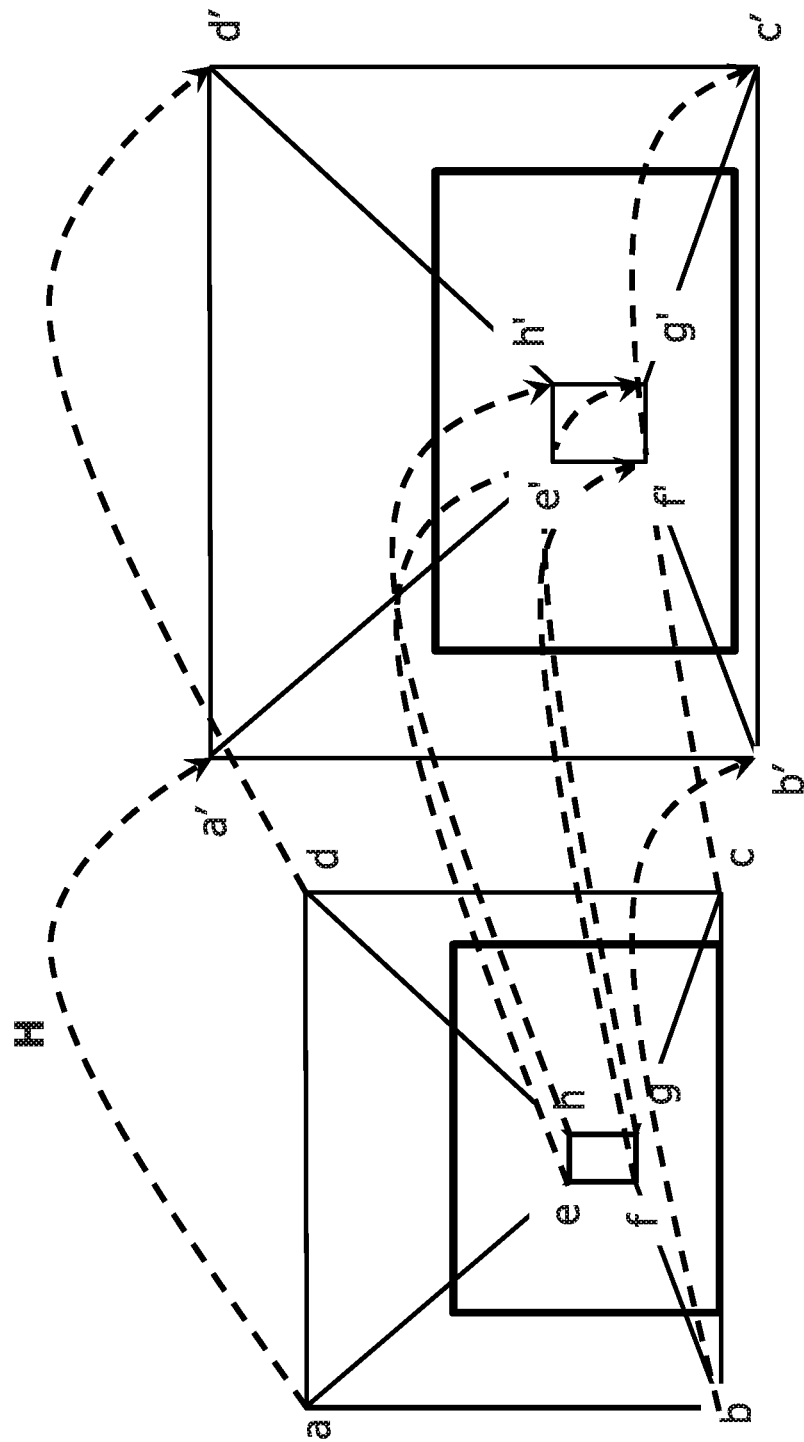
FIG. 19 illustrates an example of reference images before and after homography transformation.

The homography transformation is, for example, the transformation of a certain plane to another plane using projective transformation. In the first embodiment, the vertex coordinates a-h of the segmented regions before the vehicle movement are, for example, transformed to vertex coordinates a'-h' of the segmented regions after the vehicle movement. For example as illustrated in FIG. 19, the vertex a of the segmented region is moved to vertex a' by homography transformation, and the vertex b of the segmented region is moved to vertex b' by homography transformation.

The coordinates before homography transformation are set to (x,y) and the coordinates after homography transformation are set to (x',y'). Homography transformation is represented by the following formulas:

$$p = \begin{bmatrix} x \\ y \\ 1 \end{bmatrix} \quad (10)$$

$$P = \begin{bmatrix} X \\ Y \\ 1 \end{bmatrix} \quad (11)$$

In this case, when $$P = \frac{1}{W'} P' \quad (12)$$

and $$P' = \begin{bmatrix} X' \\ Y' \\ W' \end{bmatrix} \quad (13)$$

are established, formula (14) is derived:

$$P' = Hp \quad (14)$$

In formula (14), H is a determinant for representing homography transformation and is expressed as:

$$H = \begin{bmatrix} h_{11} & h_{12} & h_{13} \\ h_{21} & h_{22} & h_{23} \\ h_{31} & h_{32} & h_{33} \end{bmatrix} \quad (15)$$

The following formula (16) is derived when formula (14) is modified:

$$P = \frac{1}{W'} Hp = \frac{1}{W'} \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix} \quad (16)$$

The "W'" in formula (12) is discussed below.

FIG. 17A illustrates an example of the relationship between the actual size of an object and the size of an object reflected on an imaging element surface. The distance from the surface of the imaging element in the imaging device 110 to the center point of the lens is the focal length F, and the distance the center point of the lens to the object is set as Z1. The actual size of the object is set as O. The size of the object captured on the surface of the imaging element is set as L1.

Figure 17B:
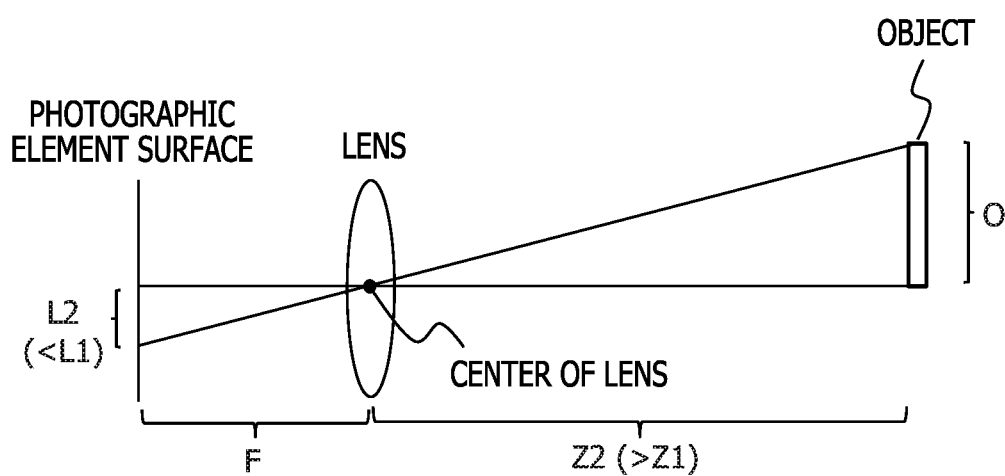

FIG. 17B illustrates an example of a relationship when an object of the same size is positioned at a distance Z2 (>Z1) which is further away than the distance in FIG. 17A. In this case, the size L2 of the object reflected on the surface of the imaging element is smaller (L2<L1) when compared to the size L1 of the object in the case illustrated in FIG. 17A positioned at a shorter distance.

Specifically, if the size of the object does not change, the size of the object reflected on the surface of the imaging element becomes smaller as the distance from the center point of the lens increases. Conversely, if the size of the object does not change, the size of the object reflected on the surface of the imaging element becomes larger as the distance from the center point of the lens decreases.

Figure 18A:
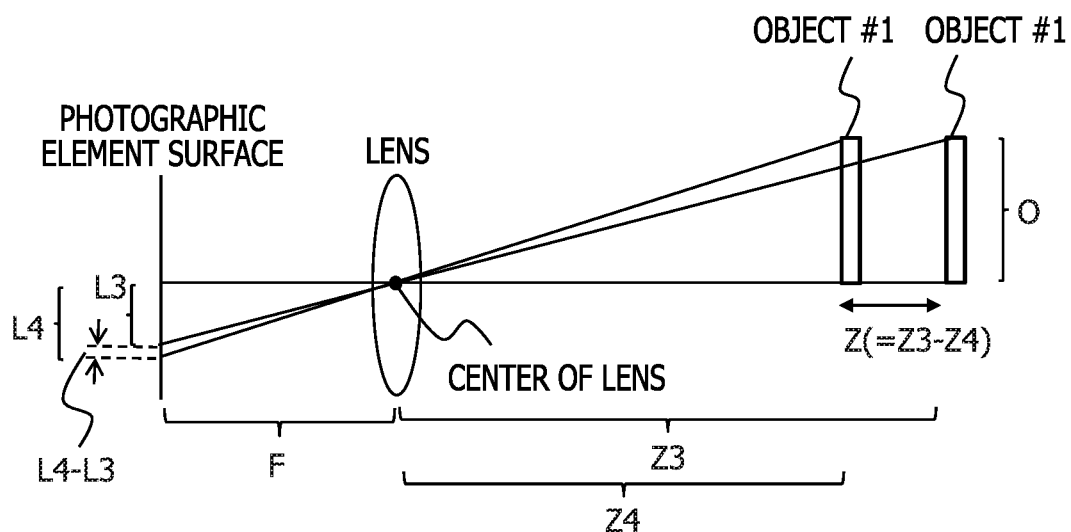
FIGS. 18A and 18B illustrate examples of the relationships between the actual size of an object and the size of an object reflected onto an imaging element surface.

FIG. 18A illustrates an example of the relationship between a change in the position of the object after the observation interval time t has elapsed and a change in the object reflected on the surface of the imaging element. As illustrated in FIG. 18A, when the vehicle 100 moves forward, object #1 appears to move further to the front in the imaging device 110. After the observation interval time t has elapsed, the distance of the object #1 from the center point of the lens changes from Z3 to Z4. At this time, the size of the object #1 reflected on the surface of the imaging element changes from L4 to L3. Specifically, in the example in FIG. 18A, the size of the object reflected on the surface of the imaging element increases by (L4−L3) after the observation interval time t has elapsed.

Figure 18B:
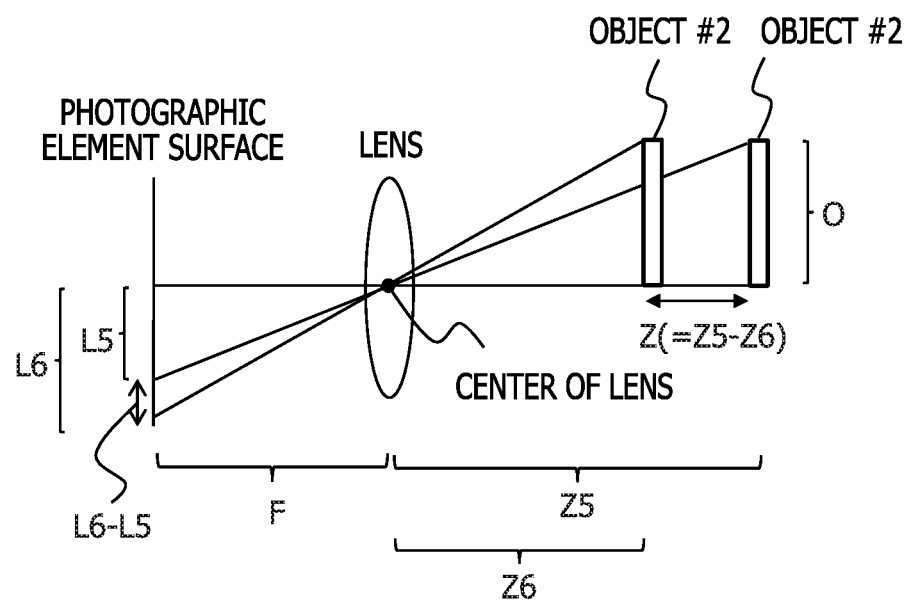

FIG. 18B illustrates an example of the relationship between a change in the position of the object and a change in the object reflected on the surface of the imaging element in the same way as FIG. 18A. In the case of FIG. 18B, while the actual size of an object #2 is O appears to be the same as the object #1 when comparing with FIG. 18A, the processing from the center point of the lens positions the object #2 closer than the object 1.

In the case of FIG. 18B the position of the object #2 after the same observation interval time t has elapsed moves by the distance Z (=Z5−Z6=Z3−Z4) in the same way as the object #1 when viewed from the imaging device 110. However, the change (=L6−L5) of the size of the object #2 reflected on the surface of the imaging element is greater when compared to the change (L4−L3) of the size in FIG. 18A.

The reason for the above discrepancy is that the object #2 is closer to the imaging device 110 than the object #1 when the object #2 moves. Alternatively, in the case in which the object #1 has moved at a distance further away from the imaging device 110, the change in the size on the surface of the imaging element is not so large. However, in the case of the object #2 that has moved at distance closer to the imaging device 110, the change in the size on the surface of the imaging element is large.

The "W'" represented in formula (16) and the like represents, for example, the distances Z1 to Z6 from the center point of the lens to the objects #1 and #2 (or represents values proportional to the distances Z1 to Z6).

For example, "W'" increases in correspondence to an increase in the distance from the imaging device 110. Therefore in formula (16), because position P after the homography transformation is "1/W'" times the position p before the transformation, the position p before the transformation becomes a value that is increased by a small value.

Conversely, "W'" decreases, for example, in correspondence to a decrease in the distance from the imaging device 110. Therefore in formula (16), the position P after the homography transformation is increased by a small value with respect to the position p before the homography transformation.

In the first embodiment as illustrated in FIGS. 13 and 14, the homography transformation is performed for each segmented region in the encoding processing unit 320. As a result, because the distances in the homography transformation applicable to the central segmented region EFGH on the plane closest to the imaging device 110 and in the homography transformation applicable to the other segmented regions are different, the respective "W'" values are also different. Specifically, in the encoding processing unit 320, the homography transformation is applied to each segmented region whereby the magnification rates of the regions including the periphery of the reference image can be increased more than the magnification rate of the region including the center point of the reference image in the segmented regions. The reason for this is that while the size of the object does not change very much due to the passage of time as much as the movement of the object, for example, as much as the distance of the object reflected on the imaging device 110, the image corresponds to an image in which the size of the object changes more in correspondence to a shorter distance.

For example, the encoding processing unit 320 performs the following processing. Specifically, the reference image transformation unit 334 holds formula (16) (or formulas (12) to (14)) in an internal memory, and incorporates the values a to h acquired from the image position calculation unit 333 as p before the homography transformation, and incorporates the values a' to h' as P after the homography transformation. The reference image transformation unit 334 then calculates the component included in the determinant H that represents the homography transformation. At this time, the reference image transformation unit 334 calculates the determinant H that represents the homography transformation for each segmented region. Therefore, if there are five segmented regions as illustrated in FIG. 14, the reference image transformation unit 334 calculates the components for the five determinants H1 to H5.

Returning to FIG. 16, the encoding processing unit 320 then uses the calculated determinants and performs homography transformation on the segmented regions of the reference image (S342). For example, the reference image transformation unit 334 uses formula (16) and incorporates the positions of the reference image into the position p before the homography transformation in order to be able to calculate the five determinants H1 to H5. As a result, for example, the positions P of the reference image after the homography transformation can be calculated.

FIG. 19 illustrates an example of reference images before and after homography transformation. In FIG. 19, the reference image is included in the quadrilateral portion represented by the bold lines. As indicated above, the central segmented region efgh of the reference image (after two-dimensional coordinate transformation) becomes the central segmented region e'f'g'h' after the vehicle movement. However, the change in the size thereof is less compared to the other regions. Conversely, the change in the sizes of the other segmented regions is greater than the change in the size of the central segmented regions efgh and e'f'g'h'.

Returning to FIG. 16, the encoding processing unit 320 then outputs the reference image after the homography transformation as an expanded reference image (S343). For example, the reference image transformation unit 334 outputs the reference image after the homography transformation to the motion search unit 330 as the expanded reference image.

The encoding processing unit 320 then finishes the expanded reference image transformation processing (S344).

Returning to FIG. 6, when the expanded reference image transformation processing is finished (S34), the encoding processing unit 320 searches for motion vectors (S36). For example, the motion search unit 330 searches for motion vectors based on the expanded reference image and the image to be encoded output from the original image sub-sampling unit 321. In this case, the motion search unit 330 may search for motion vectors based on the reference image read from the reference image storing unit 329 and the image to be encoded, and may output one of the two found motion vectors.

Next, the encoding processing unit 320 generates a predictive image (S37) and generates a difference image between the original image and the predictive image (S38).

Next, the encoding processing unit 320 performs orthogonal transformation on the difference image (S39), calculates the component (or the transformation coefficient) after the orthogonal transformation of the difference image, and quantizes the calculated transformation coefficient with the quantization step (S40).

Next, the encoding processing unit 320 performs the variable length encoding processing on the quantized transformation coefficient and the motion vector information, and further on the expanded reference image transformation parameters (e.g., a-h and a'-h') output from the image position calculation unit 333 (S17 in FIG. 7). The motion search unit 330 may output, to the variable length encoding unit 325, selected information which represents, for example, either the use of the expanded reference image or the use of the reference image read from the reference image storing unit 329 when calculating the motion vectors. In this case, the encoded and selected information is multiplexed into the compression stream and stored in the storage 340.

Next, the encoding processing unit 320 outputs the compression stream into which the variable length encoded transformation coefficient, the motion vectors, and the expanded reference image transformation parameters and the like are multiplexed (S18).

The encoding processing unit 320 conversely performs the inverse quantization processing by multiplying the quantized transformation coefficient (S40 in FIG. 6) by a quantization step (S19 in FIG. 7), and decodes the image data of the difference image before the orthogonal transformation by using the inverse orthogonal transformation processing (S20).

The encoding processing unit 320 then stores the image data of the decoded image in the reference image storing unit 329 as the reference image (S21).

When the processing in steps S18 and S21 is finished with respect to the image data of the difference image, the encoding processing unit 320 determines whether there is any image data (S22), and if image data is present (S22: Yes), the routine switches to S10 and the above processing is repeated. Conversely, if there is no image data (S22: No), the encoding processing unit 320 finishes the encoding processing.

<3. Decoding Processing>

Figure 20:
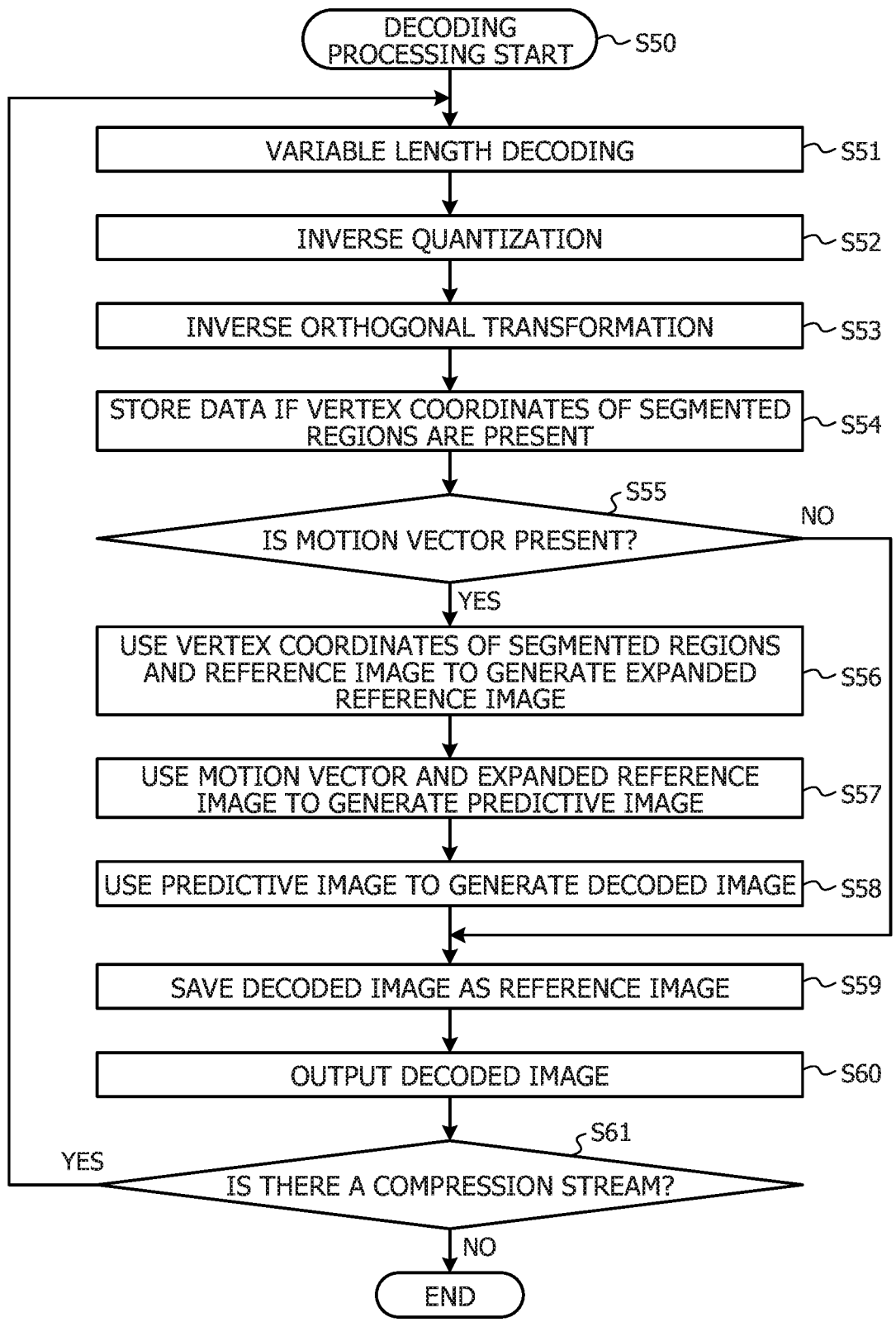
FIG. 20 is a flow chart of an example of decoding processing.

FIG. 20 is a flow chart of an example of decoding processing.

When the decoding processing starts (S50), the decoding processing unit 350 performs variable length decoding processing on the compression stream read from the storage 340 (S51).

Next, the decoding processing unit 350 performs inverse quantization processing by multiplying the variable length decoded transformation coefficient with a quantization step (S52).

Next, the decoding processing unit 350 performs inverse orthogonal transformation such as inverse DCT transformation on the inverse quantized transformation coefficient and decodes the original image data or the difference image data (S53).

Next, if the vertex coordinates a-h and a'-h' (expanded reference image transformation parameters) of the segmented regions are included in the data after the variable length decoding, the decoding processing unit 350 stores the data in a memory and the like (S54). For example, if the expanded reference image transformation parameters are present in the data after the variable length decoding, the variable length decoding unit 351 outputs the parameters to the reference image transformation unit 356, and the reference image transformation unit 356 stores the expanded reference image transformation parameters in an internal memory.

Next, the decoding processing unit 350 determines if a motion vector is present (S55). For example, the variable length decoding unit 351 determines whether motion vector information is included in the variable length decoded data.

When there are motion vectors (S55: Yes), the decoding processing unit 350 uses the vertex coordinates of the segmented region and the reference image to generate an expanded reference image (S56). For example, the reference image transformation unit 356 uses the vertex coordinates a-h and a'-h' of the segmented regions, calculates the determinant for the homography transformation, uses the calculated determinant H, and performs homography transformation on the image data of the reference image read from the reference image storing unit 355. The reference image transformation unit 356 calculates the determinant H for the homography transformation for each segmented region in the same way as the reference image transformation unit 334 of the encoding processing unit 320, and applies the homography transformation to the image data of the reference image.

Next, the decoding processing unit 350 uses the motion vectors and the expanded reference image to generate a predictive image (S57), and uses the predictive image to generate a decoded image (S58). For example, the predictive image generation unit 357 generates the predictive image, and the addition unit 354 adds the image data of the difference image and the image data of the predictive image to generate image data of the decoded image. In this case, the predictive image generation unit 357 may use either one of the expanded reference image and the reference image to generate the predictive image, and may select either one according to the selection information acquired from the variable length decoding unit 351.

Next, the decoding processing unit 350 saves the generated decoded image as a reference image and outputs the decoded image (S59, S60). For example, the addition unit 354 stores the generated image data of the decoded image in the reference image storing unit 355, and outputs the image data as decoded image data to the image analysis unit 370.

The decoding processing unit 350 then determines if there is a compression stream, and if there is no compression stream (S61: No), the decoding processing unit 350 finishes the decoding processing (S62).

However, if there are no motion vectors (S55: No), the routine switches to S59 and the decoding processing unit 350 repeats the above processing. In this case, the compressed data of the original image is included in the compression stream, and the decoding processing unit 350 performs the intra-frame decoding processing (S59-S61).

Furthermore, if there is a compression stream (S61: Yes), the routine switches to S51 and the decoding processing unit 360 repeats the above processing.

According to the first embodiment, the encoding processing unit 320 sets segmented regions in the reference image, and enlarges the reference image so as to increase the magnification rate of regions on the periphery of the reference image in comparison to the magnification rate of regions that include the center point of the reference image in the segmented regions.

As a result, the expanded reference image, for example, has a smaller magnification rate for an object in a location at a distance further away and has a larger magnification rate for an object in a location that is closer, and the reference image becomes an image that more closely resembles the image to be encoded. Therefore, the concordance rate of the image to be encoded of the expanded reference image is higher than in comparison to when the reference image is used as-is. In addition, by improving the concordance rate, the predictive image also more closely resembles the image to be encoded than when the reference image is used as-is, and a reduction of the compression rate can be avoided when encoding the difference image.

Other Embodiments

Figure 21:
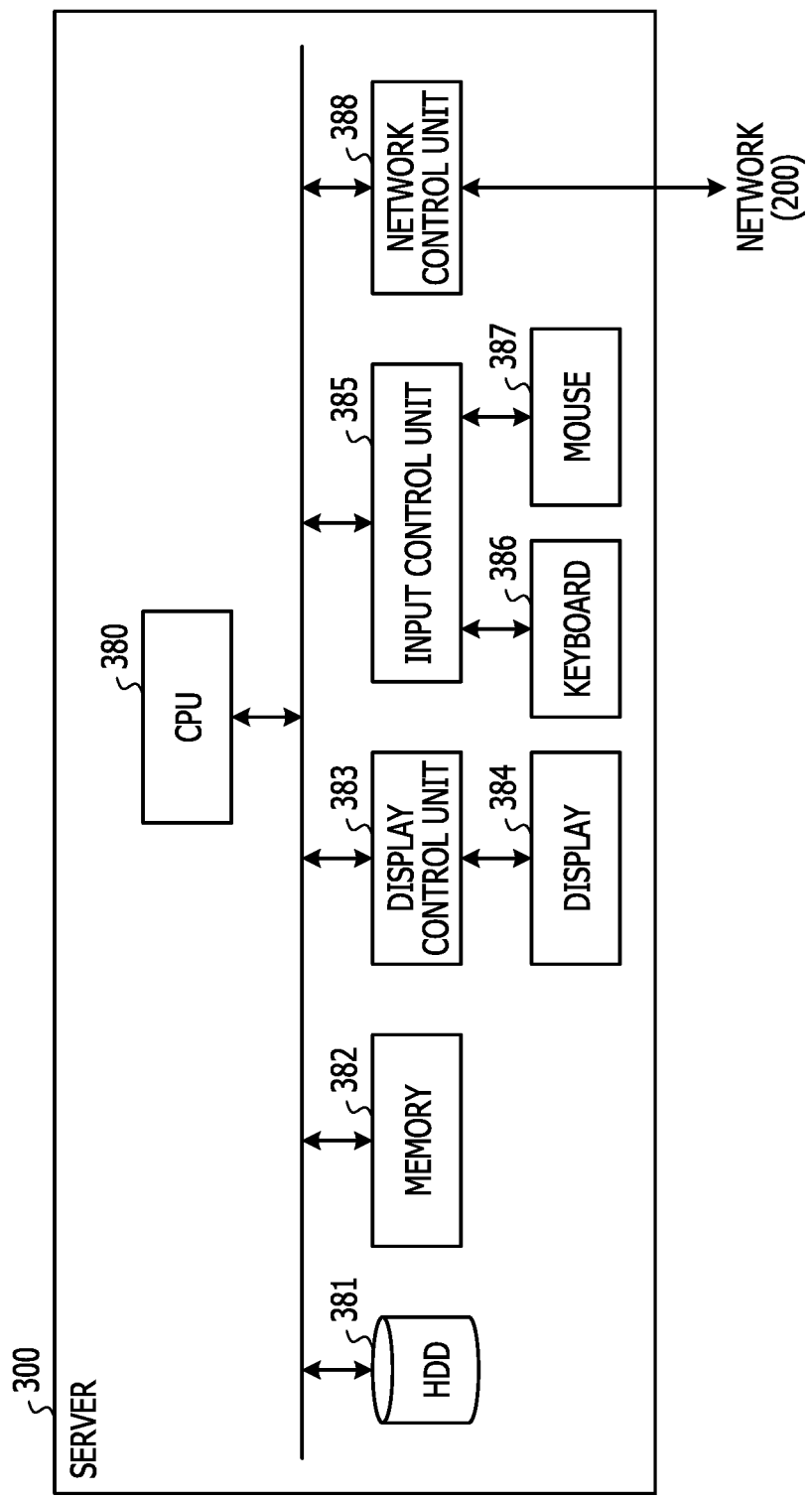
FIG. 21 illustrates an example of a server hardware configuration.

FIG. 21 illustrates an example of a hardware configuration of the server 300.

The server 300 is provided with a central processing unit (CPU) 380, a hard disc drive (HDD) 381, a memory 382, a display control unit 383, a display 384, an input control unit 385, a keyboard 386, a mouse 387, and a network control unit 388.

The CPU 380, for example, reads and executes a program stored in the memory 382 thereby realizing the functions of the H.26x decoding processing unit 310, the encoding processing unit 320, the decoding processing unit 350, and the image analysis unit 370. The CPU 380, for example, reads and executes a program stored in the memory 382 corresponds to the H.26x decoding processing unit 310, the encoding processing unit 320, the decoding processing unit 350, and the image analysis unit 370.

The HDD 381, for example, corresponds to the storage 340. Furthermore, the network control unit 388 corresponds, for example, to the H.26x decoding processing unit 310 and the encoding processing unit 320.

In place of the CPU 380, a controller or a processor may be used such as a micro processing unit (MPU), a digital signal processor (DSP), or a field programmable gate array (FPGA).

Figure 22:
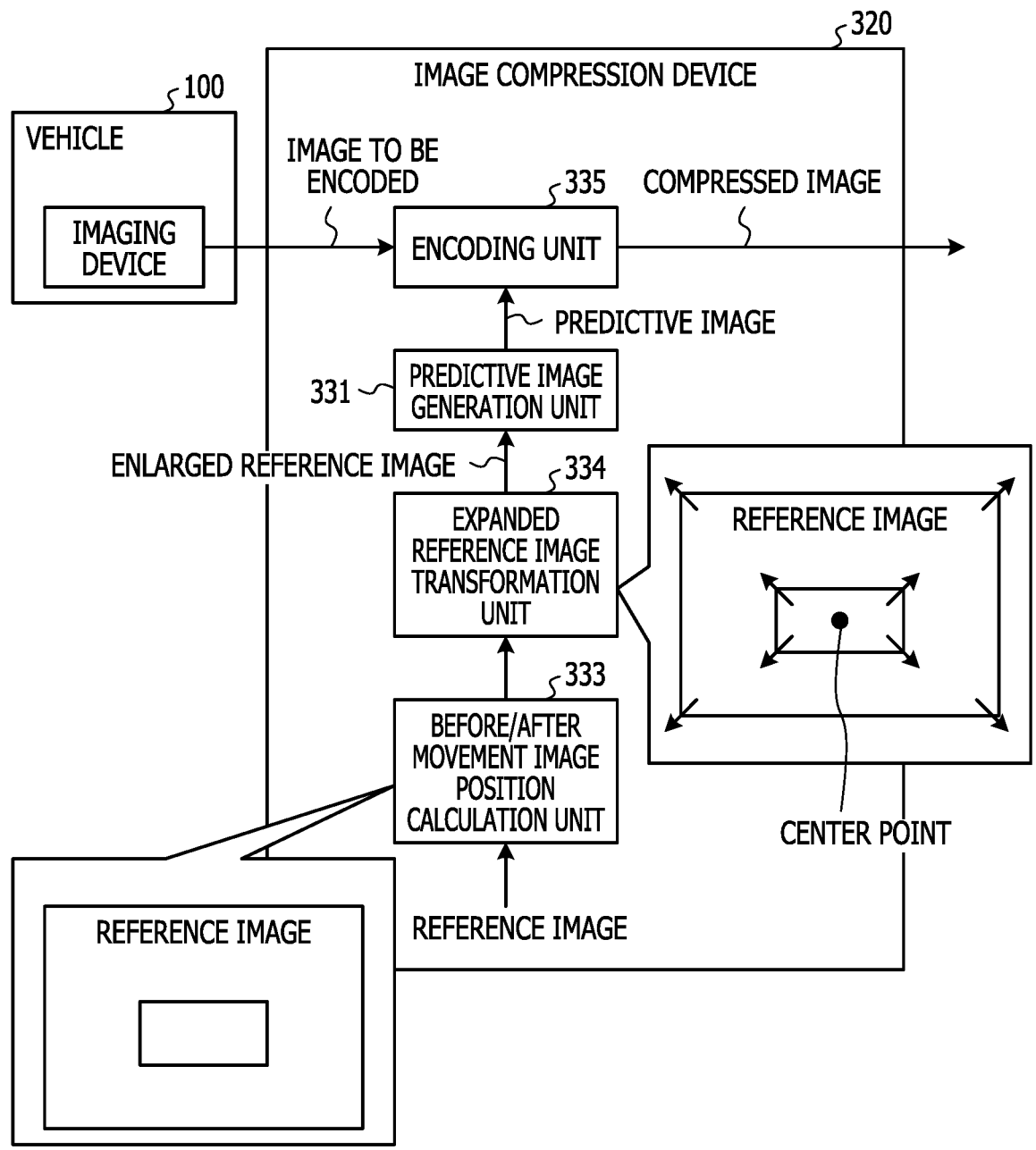
FIG. 22 illustrates an example of a configuration of an image compression device.

FIG. 22 illustrates an example of a configuration of an image compression device 320. The image compression device 320 corresponds, for example, to the encoding processing unit 320 of the first embodiment.

The image compression device 320 is provided with the before/after movement image position calculation unit 333, the expanded reference image transformation unit 334, the predictive image generation unit 331, and an encoding unit 335. The encoding unit 355 corresponds, for example, to the subtraction unit 322, the orthogonal transformation unit 323, the quantization unit 324, and the variable length encoding unit 325 of the first embodiment.

The before/after movement image position calculation unit 333 sets the segmented regions in the reference image corresponding to the image to be encoded.

The expanded reference image transformation unit 334 enlarges the reference image so as to increase the magnification rate of regions on the periphery of the reference image more in comparison to the magnification rate of the region that includes the center point of the reference image in the segmented regions. The principal point of the image is the contact point of an optical axis of the image incident to the imaging device 110 and an imaging element in the imaging device 110.

The predictive image generation unit 331 uses the enlarged reference image to generate the predictive image.

The encoding unit 335 uses the generated predictive image to compress and encode the image data of the image to be encoded.

In this way the image compression device 320 enlarges the reference image so as to increase the magnification rate of regions on the periphery the reference image more in comparison to the magnification rate of the region that includes the center point of the reference image in the segmented regions.

As a result, while the size of the object does not change very much due to the passage of time as much as the movement of the object, for example, as much as the distance of the object reflected on the imaging device 110, a reference image in which the size of the object changes more in correspondence to a shorter distance can be generated.

Therefore, the generated reference image becomes an image that resembles the image to be captured by the imaging device 110 in comparison to when the reference image is used as-is, and the predictive image generated using this image also becomes an image that resembles the image to be captured. Consequently, the image compression device 320 is capable of improving the concordance rate between the reference image and the image to be encoded.

Further, even if the predictive image is used when compressing the image to be encoded in the image compression device 320, the use of the expanded reference image more closely resembles the image to be encoded in comparison to when the reference image is used as-is and a reduction in the compression rate can be avoided.

All examples and conditional language recited herein of the RFID tag and the high frequency circuit are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium for storing an image compression program, the image compression program causing a processor to execute a process, the process comprising:

executing first processing that includes acquiring image data of an image captured by an imaging device mounted to a vehicle;

executing second processing that includes setting a segmented region in a reference image corresponding to an image to be compressed and encoded;

executing third processing that includes enlarging the reference image so that a magnification rate of a segmented region including a periphery of the reference image is greater than a magnification rate of another segmented region including a center point of the reference image, the center point being a contact point of an optical axis of the image incident to the imaging device and an imaging element in the imaging device;

executing fourth processing that includes generating a predictive image in accordance with the enlarged reference image; and executing fifth processing that includes compressing and encoding image data of the image to be encoded in accordance with the generated predictive image.

2. The non-transitory computer-readable storage medium according to claim 1, wherein
the second processing is configured to:
calculate a movement amount of the vehicle based on a speed of the vehicle, an observation interval time, and a steering angle of a steering wheel in the vehicle, the speed, the observation interval time and the steering angle being received from the vehicle; and
set the segmented region based on the calculated movement amount of the vehicle.

3. The non-transitory computer-readable storage medium according to claim 2, wherein the second processing is configured to:
calculate a coordinate position (x',y',z') of an object after the vehicle moves based on the speed of the vehicle, the observation interval time, and the steering angle of the steering wheel, the coordinate position (x',y',z') being a coordinate position of the object after the vehicle moves in which a coordinate position of the vehicle after the movement of the vehicle is set as (0,0,0); and
calculate the movement amount of the vehicle in accordance with the calculated coordinate position (x',y',z') and a coordinate position (x,y,z) before the movement, the coordinate position (x,y,z) being a coordinate position of the object before the vehicle moves in which a coordinate position of the vehicle before the movement of the vehicle is set as (0,0,0).

4. The non-transitory computer-readable storage medium according to claim 3, wherein the second processing is configured to:
calculate a movement angle φ of the vehicle by incorporating the values of v, t and θ into a following formula function (17)

$$\varphi = \frac{l}{r} = \frac{vt \cdot \sin\theta}{H}, \tag{17}$$

where the value of v is the speed of the vehicle, the value of t is the observation interval time, the value of θ is the steering angle of the steering wheel and is not "0", and the formula function (17) is read from a memory of the computer; and
calculate the coordinate position (x',y',z') of the object after the vehicle moves by incorporating the movement angle φ and the coordinate position (x,y,z) into a formula function (18)

$$\begin{pmatrix} x' \\ y' \\ z' \\ 1 \end{pmatrix} = \begin{pmatrix} \cos(-\varphi) & -\sin(-\varphi) & 0 & -r \\ \sin(-\varphi) & \cos(-\varphi) & 0 & 0 \\ 0 & 0 & 1 & 0 \\ 0 & 0 & 0 & 1 \end{pmatrix} \begin{pmatrix} 1 & 0 & 0 & 0 \\ 0 & 1 & 0 & 0 \\ 0 & 0 & 1 & 0 \\ 0 & 0 & 0 & 1 \end{pmatrix} \begin{pmatrix} x \\ y \\ z \\ 1 \end{pmatrix}, \tag{18}$$

where the value of r is a turning radius of the vehicle, and the formula function (18) is read from the memory of the computer.

5. The non-transitory computer-readable storage medium according to claim 4, wherein the second processing is configured to:
calculate the coordinate position (x',y',z') of the object by incorporating the coordinate position (x,y,z) of the object before the vehicle moves into a following formula function (19)

$$\begin{pmatrix} x' \\ y' \\ z' \\ 1 \end{pmatrix} = \begin{pmatrix} 1 & 0 & 0 & 0 \\ 0 & 1 & 0 & -vt \\ 0 & 0 & 1 & 0 \\ 0 & 0 & 0 & 1 \end{pmatrix} \begin{pmatrix} x \\ y \\ z \\ 1 \end{pmatrix}, \tag{19}$$

where the value of v is the speed of the vehicle, the value of t is the observation interval time, and the formula function (19) is read from the memory of the computer.

6. The non-transitory computer-readable storage medium according to claim 1, wherein the first processing is configured to:
set a first segmented region before the vehicle moves in the reference image; and
set a second segmented region after the vehicle moves in the reference image.

7. The non-transitory computer-readable storage medium according to claim 6, further comprising:
executing sixth processing that includes transforming the vertex coordinates of the first and second segmented regions represented by a three-dimensional coordinate, to a two-dimensional coordinate on the reference image.

8. The non-transitory computer-readable storage medium according to claim 7, further comprising:
executing seventh processing that includes compressing and encoding the vertex coordinates of the first and second segmented regions transformed to the two-dimensional coordinate, and multiplexing the compressed and encoded vertex coordinates with the compressed and encoded image data.

9. The non-transitory computer-readable storage medium according to claim 6, wherein:
the first and second segmented regions include a central segmented region that includes a center point of the reference image, an upper segmented region and a lower segmented region in the up-down direction of the central segmented region, and a right segmented region and a left segmented region in the left-right direction of the central segmented region.

10. The non-transitory computer-readable storage medium according to claim 1, wherein the third processing is configured to enlarge the reference image by performing, on the reference image, homography transformation that uses a value W' which is proportional to a distance from the imaging device to an object captured by the imaging device in the reference image.

11. A compression encoding device for compressing and encoding image data of an image captured by an imaging device mounted to a vehicle, the compression encoding device comprising:
a memory; and
a processor coupled to the memory and configured to:
execute first processing that includes acquiring image data of an image captured by an imaging device mounted to a vehicle;

execute second processing that includes setting a segmented region in a reference image corresponding to an image to be compressed and encoded;

execute third processing that includes enlarging the reference image so that a magnification rate of a segmented region including a periphery of the reference image is greater than a magnification rate of another segmented region including a center point of the reference image, the center point being a contact point of an optical axis of the image incident to the imaging device and an imaging element in the imaging device;

execute fourth processing that includes generating a predictive image in accordance with the enlarged reference image; and execute fifth processing that includes compressing and encoding image data of the image to be encoded in accordance with the generated predictive image.

12. An image compression method performed by a computer, the method comprising:

executing first processing that includes acquiring image data of an image captured by an imaging device mounted to a vehicle;

executing second processing that includes setting a segmented region in a reference image corresponding to an image to be compressed and encoded;

executing third processing that includes enlarging the reference image so that a magnification rate of a segmented region including a periphery of the reference image is greater than a magnification rate of another segmented region including a center point of the reference image, the center point being a contact point of an optical axis of the image incident to the imaging device and an imaging element in the imaging device;

executing fourth processing that includes generating a predictive image in accordance with the enlarged reference image; and executing fifth processing that includes compressing and encoding image data of the image to be encoded in accordance with the generated predictive image.

* * * * *